(12) United States Patent
Zhang et al.

(10) Patent No.: US 11,487,151 B2
(45) Date of Patent: Nov. 1, 2022

(54) LIQUID CRYSTAL DISPLAY PANEL AND DISPLAY DEVICE

(71) Applicants: HEFEI BOE DISPLAY TECHNOLOGY CO., LTD., Anhui (CN); BOE Technology Group Co., Ltd., Beijing (CN)

(72) Inventors: Lin Zhang, Beijing (CN); Hongliang Wang, Beijing (CN); Ke Dai, Beijing (CN); Lei Guo, Beijing (CN); Yanping Liao, Beijing (CN)

(73) Assignees: Hefei Boe Display Technology Co., Ltd., Anhui (CN); Beijing BOE Technology Development Co., Ltd., Beijing (CN)

( * ) Notice: Subject to any disclaimer, the term of this patent is extended or adjusted under 35 U.S.C. 154(b) by 105 days.

(21) Appl. No.: 16/959,217

(22) PCT Filed: Aug. 29, 2019

(86) PCT No.: PCT/CN2019/103411
§ 371 (c)(1),
(2) Date: Jun. 30, 2020

(87) PCT Pub. No.: WO2021/035636
PCT Pub. Date: Mar. 4, 2021

(65) Prior Publication Data
US 2022/0004053 A1    Jan. 6, 2022

(51) Int. Cl.
*G02F 1/1335* (2006.01)

(52) U.S. Cl.
CPC .. *G02F 1/133531* (2021.01); *G02F 1/133504* (2013.01)

(58) Field of Classification Search
None
See application file for complete search history.

(56) References Cited

U.S. PATENT DOCUMENTS 6,707,515 B1    3/2004  Ide et al.
7,283,187 B2 *  10/2007 Kwon ................. G02B 5/32
                                                      349/112
(Continued)

FOREIGN PATENT DOCUMENTS

CN    1236445 A   11/1999
CN    1591120 A    3/2005
(Continued)

OTHER PUBLICATIONS

Office Action for corresponding Chinese application No. 201980001555.9 dated Sep. 27, 2021.
(Continued)

*Primary Examiner* — Ashok Patel
(74) *Attorney, Agent, or Firm* — ArentFox Schiff LLP; Michael Fainberg

(57) ABSTRACT

According to a liquid crystal display panel and a display device in the present disclosure, since at least one of a first polarizer and a second polarizer has a light scattering structure, polarized light of corresponding colors transmitted by sub-pixel units with different colors in a liquid crystal display structure can be uniformly diffused by the light scattering structure. That is to say, the light scattering structure plays a role for uniformly mixing the polarized light of different colors. Therefore, the rainbow pattern phenomenon is effectively improved or even eliminated, and the display quality is improved.

20 Claims, 14 Drawing Sheets

(56) References Cited

U.S. PATENT DOCUMENTS

| | | |
|---|---|---|
| 2005/0122591 A1 | 6/2005 | Parker et al. |
| 2005/0157233 A1 | 7/2005 | Wu et al. |
| 2006/0038935 A1 | 2/2006 | Kim |
| 2007/0030419 A1 | 2/2007 | Chang |
| 2013/0106923 A1 | 5/2013 | Shields et al. |
| 2015/0029437 A1* | 1/2015 | Sakai ................ G02F 1/133634 349/61 |
| 2020/0292894 A1 | 9/2020 | Liu et al. |
| 2021/0231988 A1* | 7/2021 | Yoshikawa ....... G02F 1/133528 |
| 2022/0035203 A1 | 2/2022 | Shih et al. |

FOREIGN PATENT DOCUMENTS

| | | | |
|---|---|---|---|
| CN | 1737655 A | | 2/2006 |
| CN | 1908755 A | | 2/2007 |
| CN | 101164006 A | | 4/2008 |
| CN | 106782382 A | | 5/2017 |
| CN | 108020956 A | | 5/2018 |
| CN | 108983463 A | | 12/2018 |
| CN | 109581728 A | | 4/2019 |
| WO | 2012014849 A1 | | 2/2012 |
| WO | 2020043163 | * | 5/2020 |

OTHER PUBLICATIONS

Office Action for corresponding Indian application No. 202027056115 dated Apr. 5, 2022.
Office Action for corresponding Chinese application No. 201980001555.9 dated May 5, 2022.
Extended European Search Report for 19933239.6 dated Jul. 22, 2022.

* cited by examiner

-- Prior Art --

LIQUID CRYSTAL DISPLAY PANEL AND DISPLAY DEVICE

The present disclosure is a US National Stage of International Application No. PCT/CN2019/103411, filed Aug. 29, 2019, which is hereby incorporated by reference in its entirety.

FIELD

The present disclosure relates to the technical field of display, and particularly to a liquid crystal display panel and a display device.

BACKGROUND

Liquid Crystal Display (LCD) panel is an important flat panel display equipment, and has been widely used in the fields of mobile phones, vehicles, displays, televisions, public displays, and the like. With the widespread use and increase in size of the liquid crystal display panel, more and more people use the liquid crystal display panel to watch movies and play games, so that the focus on display quality is also increasing.

SUMMARY

An embodiment of the present disclosure provides a liquid crystal display panel, including:

a liquid crystal display structure and a liquid crystal light control structure arranged in an overlapping manner with the liquid crystal display structure, a first polarizer located on one side of the liquid crystal display structure facing away from the liquid crystal light control structure, and a second polarizer located on one side of the liquid crystal light control structure facing away from the liquid crystal display structure, where at least one of the first polarizer and the second polarizer has a light scattering structure.

In a possible implementation manner, the liquid crystal display panel provided by an embodiment of the present disclosure further includes: a third polarizer located between the liquid crystal display structure and the liquid crystal light control structure, where at least one of the first polarizer, the second polarizer and the third polarizer has the light scattering structure.

In a possible implementation manner, in the liquid crystal display panel provided by an embodiment of the present disclosure, a film layer in a polarizer having the light scattering structure is doped with transparent particles to constitute the light scattering structure.

In a possible implementation manner, in the liquid crystal display panel provided by an embodiment of the present disclosure, the polarizer having the light scattering structure includes: a pressure-sensitive adhesive layer, a first optical film layer, a first adhesive layer, a polyvinyl alcohol film layer, a second adhesive layer and a second optical film layer that are successively arranged in an overlapping manner; and the pressure-sensitive adhesive layer is disposed between the first optical film layer and the liquid crystal display structure, or between the first optical film layer and the liquid crystal light control structure, where, at least one film layer of the pressure-sensitive adhesive layer, the first optical film layer, the first adhesive layer, the polyvinyl alcohol film layer, the second adhesive layer, and the second optical film layer is doped with the transparent particles to constitute the light scattering structure.

In a possible implementation manner, in the liquid crystal display panel provided by an embodiment of the present disclosure, the pressure-sensitive adhesive layer of the first polarizer is doped with the transparent particles to constitute the light scattering structure.

In a possible implementation manner, in the liquid crystal display panel provided by an embodiment of the present disclosure, the polarizer having the scattering structure includes:

a pressure-sensitive adhesive layer, a first optical film layer, a first adhesive layer, a polyvinyl alcohol film layer, a second adhesive layer and a second optical film layer that are successively arranged in an overlapping manner; and the pressure-sensitive adhesive layer is disposed between the first optical film layer and the liquid crystal display structure, or between the first optical film layer and the liquid crystal light control structure, where, the light scattering structure is located on one side of the second optical film layer facing away from the second adhesive layer, and/or the light scattering structure is located between the pressure-sensitive adhesive layer and the liquid crystal display structure, and/or the light scattering structure is located between at least one pair of two adjacent film layers among the pressure-sensitive adhesive layer, the first optical film layer, the first adhesive layer, the polyvinyl alcohol film layer, the second adhesive layer and the second optical film layer.

In a possible implementation manner, in the liquid crystal display panel provided by an embodiment of the present disclosure, the light scattering structure includes: an adhesive, and transparent particles dispersed in the adhesive.

In a possible implementation manner, in the liquid crystal display panel provided by an embodiment of the present disclosure, the light scattering structure is located on one side of the second optical film layer facing away from the second adhesive layer;

the polarizer having the light scattering structure further includes: a transparent protective film disposed on one side of the light scattering structure facing away from the second optical film layer.

In a possible implementation manner, in the liquid crystal display panel provided by an embodiment of the present disclosure, the light scattering structure is a film layer constituted by transparent particles.

In a possible implementation manner, in the liquid crystal display panel provided by an embodiment of the present disclosure, one side of the light scattering structure is in contact with the first adhesive layer or the second adhesive layer;

the polarizer having the light scattering structure further includes: a third adhesive layer in contact with the other side of the one of the light scattering structure.

In a possible implementation manner, in the liquid crystal display panel provided by an embodiment of the present disclosure, a thickness of the light scattering structure is at least in a nanometer scale.

In a possible implementation manner, in the liquid crystal display panel provided by an embodiment of the present disclosure, the polarizer having the light scattering structure has a haze value ranges from 5% to 100%.

In a possible implementation manner, in the liquid crystal display panel provided by an embodiment of the present disclosure, the polarizer having the light scattering structure has a haze value ranges from 40% to 80%.

In a possible implementation manner, in the liquid crystal display panel provided by an embodiment of the present disclosure, a diameter of a transparent particle is in a nanometer scale.

In a possible implementation manner, in the liquid crystal display panel provided by an embodiment of the present disclosure, a material of the transparent particles is acrylic or silica.

In a possible implementation manner, in the liquid crystal display panel provided by an embodiment of the present disclosure, a material of at least one of the first optical film layer and the second optical film layer is triacetyl cellulose, polyethylene terephthalate, acrylic acid or cycloolefin polymer.

In a possible implementation manner, in the liquid crystal display panel provided by an embodiment of the present disclosure,
a material of the first optical film of the first polarizer, a material of the first optical film and the second optical film of the second polarizer, and a material of the first optical film of the third polarizer are triacetyl cellulose; and
a material of the second optical film of the first polarizer is polyethylene terephthalate, acrylic acid or cycloolefin polymer; and
a material of the second optical film of the third polarizer is polyethylene terephthalate, acrylic acid or cycloolefin polymer.

In a possible implementation manner, in the liquid crystal display panel provided in an embodiment of the present disclosure, the pressure-sensitive adhesive layer is doped with transparent particles to constitute the light scattering structure, and the polarizer having the light scattering structure further includes:
a fourth adhesive layer disposed on one side of the pressure-sensitive adhesive layer facing away from the first optical film layer, and a third optical film layer disposed between the fourth adhesive layer and the pressure-sensitive adhesive layer.

In a possible implementation manner, in the liquid crystal display panel provided in an embodiment of the present disclosure, the liquid crystal light control structure includes: a plurality of signal lines extending along a first direction and a second direction crossing each other, where the plurality of signal lines are fold lines.

In a possible implementation manner, in the liquid crystal display panel provided by an embodiment of the present disclosure, the liquid crystal display structure includes: a plurality of gate lines extending along the first direction, and a plurality of first light-shielding lines, wherein the plurality of gate lines overlap with the plurality of first light-shielding lines in a direction perpendicular to the liquid crystal display panel;
the liquid crystal light control structure includes: a plurality of second light-shielding lines, wherein the plurality of signal lines extending along the first direction overlap with the plurality of second light-shielding lines in the direction perpendicular to the liquid crystal display panel; and
a ratio of a width of the first light-shielding line to a width of the second light-shielding line ranges from 2.5 to 4.

In a possible implementation manner, in the liquid crystal display panel provided by an embodiment of the present disclosure, the width of the first light-shielding line ranges from 100 µm to 120 µm, and the width of the second light-shielding line ranges from 30 µm to 40 µm.

In a possible implementation manner, in the liquid crystal display panel provided by an embodiment of the present disclosure, the liquid crystal light control structure further includes: a plurality of light control units defined by the plurality of signal lines;
the liquid crystal display structure includes a plurality of grid lines extending along the first direction and the second direction crossing each other, and a plurality of sub-pixel units defined by the plurality of grid lines, where N sub-pixel units arranged continuously along the first direction of the plurality of sub-pixel units constitute a pixel unit, where N is a positive integer;
a plurality of the pixel units and the plurality of light control units are respectively arranged in an array; and
along the first direction, a maximum length of one of the plurality of light control units is m times a length of one of the plurality of pixel units;
along the second direction, a width of one of the plurality of the light control units is n times a width of one of the plurality of pixel units; m and n are both positive integers.

An embodiment of the present disclosure provides a display device, including: the liquid crystal display panel and a backlight.

An embodiment of the present disclosure provides a liquid crystal display panel, including: a liquid crystal display structure and a liquid crystal light control structure that are arranged in an overlapping manner;
the liquid crystal display structure includes: a plurality of first gate lines extending along a first direction, and a plurality of first light-shielding lines, where the plurality of first gate lines overlap with the plurality of first light-shielding lines in a direction perpendicular to the liquid crystal display panel;
the liquid crystal light control structure includes: a plurality of second gate lines extending along the first direction, a plurality of second light-shielding lines, where the plurality of second gate lines overlap with the plurality of second light-shielding lines in the direction perpendicular to the liquid crystal display panel, and the plurality of second gate lines are fold lines;
a first orthographic projection of the first light-shielding line in the direction perpendicular to the liquid crystal display panel at least partially overlaps with a second orthographic projection of the second light-shielding line in the direction perpendicular to the liquid crystal display panel; and
the liquid crystal display panel further includes: a light scattering structure located in an area enclosed by the first orthographic projection and the second orthographic projection.

In a possible implementation manner, in the liquid crystal display panel provided by an embodiment of the present disclosure, the light scattering structure is further located in a display area other than the area enclosed by the first orthographic projection and the second orthographic projection.

In a possible implementation manner, in the liquid crystal display panel provided by an embodiment of the present disclosure, a shape of the area enclosed by the first orthographic projection and the second orthographic projection is a triangle or a semicircle.

DETAILED DESCRIPTION OF THE EMBODIMENTS

Figure 1:
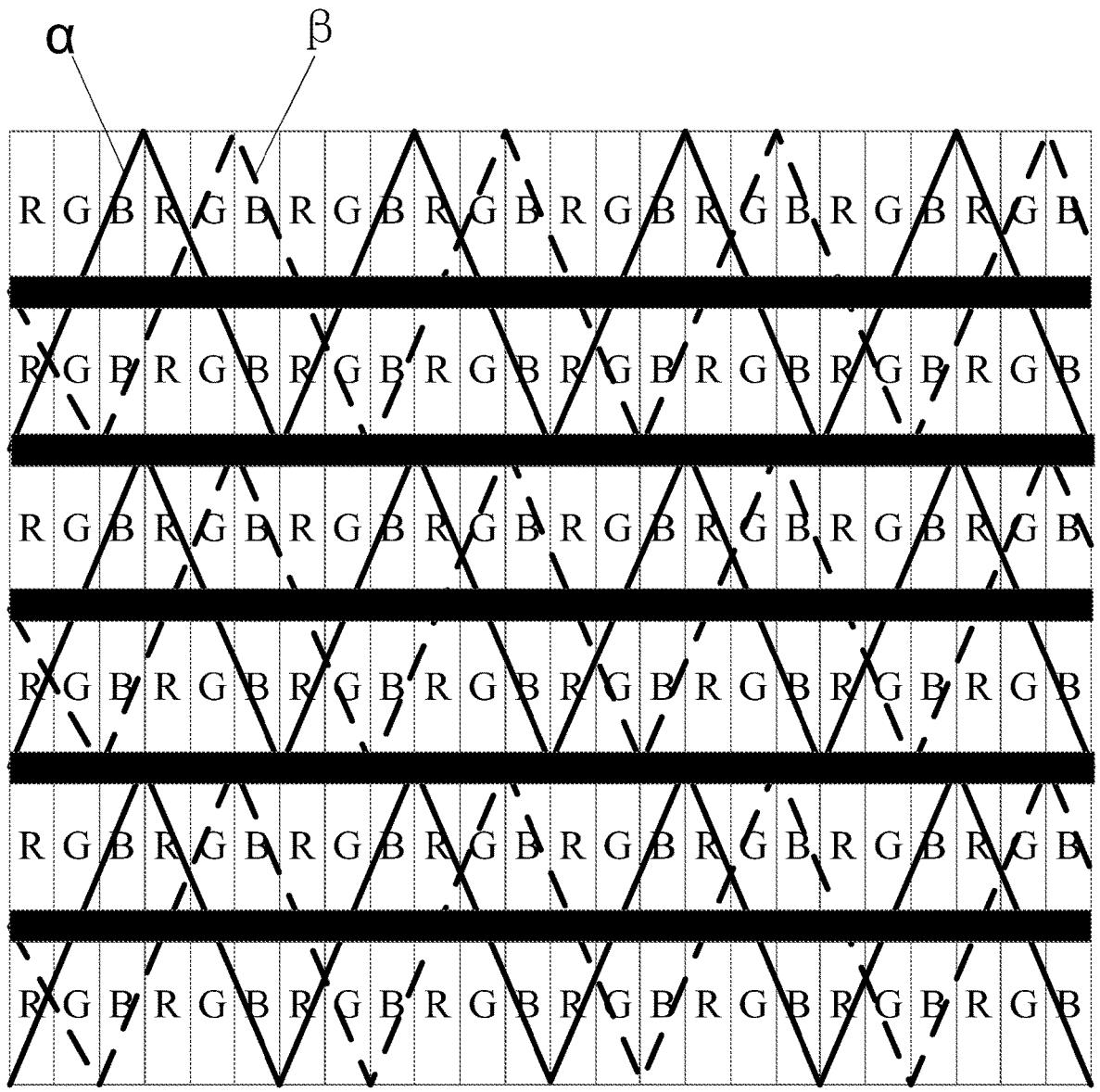
FIG. 1 is a schematic diagram of the principle of rainbow patterns in the related art.
Figure 2:
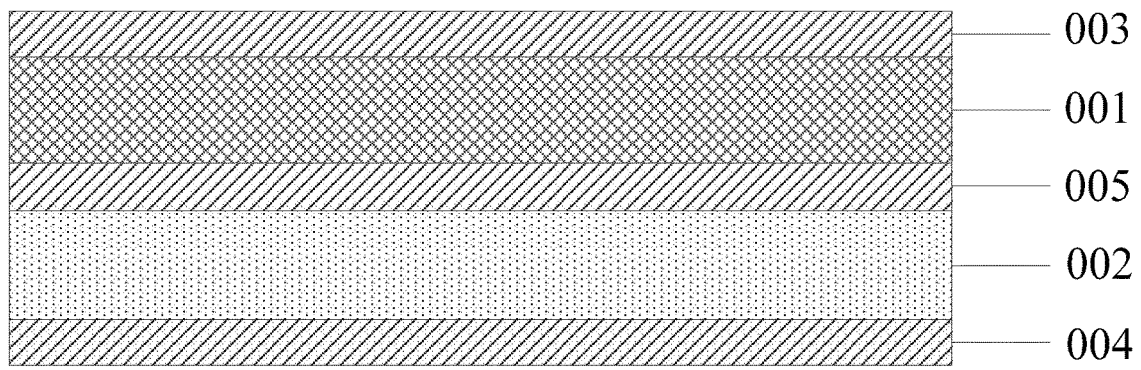
FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19 and FIG. 20 are schematic diagrams of cross-sectional structures of a liquid crystal display panel provided by embodiments of the present disclosure, respectively.

In order to make the purpose, technical solutions and advantages of the embodiments of the present disclosure more clear, the technical solutions of the embodiments of the present disclosure will be described clearly and completely in conjunction with the drawings of the embodiments of the present disclosure. Obviously, the described embodiments are part of the embodiments of the present disclosure, but not all the embodiments. On the basis of the described embodiments of the present disclosure, all other embodiments obtained by a person of ordinary skill in the art without inventive efforts fall within the protection scope of the present disclosure.

Unless otherwise defined, the technical or scientific terms used herein shall have the usual meanings understood by a person of ordinary skill in the art to which the present disclosure belongs. The words "first", "second" and the like used in the description and claims of the present disclosure do not indicate any order, quantity or importance, but are only used to distinguish different components. The word "including" or "containing" and the like, means that an element or item preceding the word includes an element or item listed after the word and the equivalent thereof, without excluding other elements or objects. The words "inner", "outer", "upper", "lower" and the like are only used to indicate the relative positional relationship. When the absolute position of the described object changes, the relative positional relationship may also change accordingly.

In the related art, the liquid crystal display panel includes a liquid crystal display structure and a backlight unit. By combining local dimming (LD) technology to control the backlight unit, the image quality of the liquid crystal display panel can be improved. Generally, the local dimming technology is to divide the entire backlight unit into a plurality of backlight blocks that can be driven separately, and each backlight block includes one or more LEDs. According to gray levels that need to be displayed in different parts of a display screen, the driving current of the LEDs of the backlight blocks corresponding to these parts is automatically adjusted, so that the brightness of each block in the backlight unit can be adjusted individually, thereby improving the contrast of the display screen.

However, the local dimming technology is suitable for a direct type backlight unit, and LEDs as light sources are evenly distributed across the back plate, for example. In order to use the local dimming technology in, for example, a side-type backlight unit, a liquid crystal light control structure needs to be added between the liquid crystal display panel and the side-type backlight unit, and the liquid crystal light control structure can control the light transmittance in a predetermined area. For a part with higher picture brightness (gray level) in the liquid crystal display structure, the light transmittance of the corresponding area of the liquid crystal light control structure is also high, and more light from the backlight unit is allowed to pass through. For a part with lower picture brightness in the liquid crystal display structure, the light transmittance of the corresponding area of the liquid crystal light control structure is also low, and less light from the backlight unit is allowed to pass through, so that the aims of improving the contrast of the display and enhancing the display quality are fulfilled. In addition, in the case of forming the direct type backlight unit directly on the direct type backlight source, it is difficult to achieve high density (the number of backlight units per unit area) and precision in dividing the backlight unit. When the requirements on the division density and precision of the light control units in the liquid crystal light control structure are high, the requirements can be met by using the liquid crystal light control structure, and the manufacturing process of the liquid crystal light control structure is easy to realize.

Specifically, the liquid crystal display panel including the liquid crystal display structure and the liquid crystal light control structure is a dual cell structure, and the liquid crystal display structure and the liquid crystal light control structure each contain a layer of black matrix (BM). However, the two overlaid layers of BM have similar grid patterns, and are prone to moiré. In order to avoid poor moiré, the BM design of the liquid crystal display structure and the BM design of the liquid crystal light control structure are different, in which the BM (black bar in FIG. 1) of the liquid crystal display structure is linear, and the BM (black fold line in FIG. 1) of the liquid crystal light control structure is in a fold line shape. Thus, the BM in the liquid crystal display structure and the BM in the liquid crystal light control structure do not have the same or similar patterns, so that human eyes cannot feel moiré, and the effect of eliminating or improving moiré is achieved.

However, as shown in FIG. 1, the BM in the fold line shape in the liquid crystal light control structure blocks different sub-pixels to different degrees; specifically, the sub-pixels located at the overlapping position of the BM in the fold line shape in the liquid crystal light control structure and the BM in the liquid crystal display structure are less blocked by the BM in the fold line shape. Therefore, the aperture ratio of the sub-pixel located at the overlapping position is relatively larger, and the color of the sub-pixel is more exhibited when the liquid crystal display panel displays. However, the BM in the fold line shape in the liquid crystal light control structure is overlaid with the BM in the liquid crystal display structure, so that the BM in the fold line shape has different blocking conditions on the sub-pixels in the liquid crystal display structure under different viewing angles. For example, under the a viewing angle in FIG. 1, the BM in the fold line shape blocks G sub-pixels less, and the liquid crystal display panel displays the color of the G sub-pixels more when displaying. Under the 0 viewing angle, the BM in the fold line shape blocks R sub-pixels less, and the liquid crystal display panel displays the color of the R sub-pixels more when displaying. Based on this, the liquid crystal display panel will exhibit a rainbow pattern.

It should be noted that FIG. 1 only exemplarily provides sub-pixels of three colors of RGB. In specific implementation, it may also include, for example, white sub-pixels W, yellow sub-pixels Y, or sub-pixels of other colors, which is not limited herein.

Regarding the phenomenon of rainbow patterns in the related art, embodiments of the present disclosure provide a liquid crystal display panel and a display device.

The specific implementation of the liquid crystal display panel and the display device provided by the embodiments of the present disclosure will be described in detail below with reference to the drawings. The thickness and shape of each film layer in the drawings do not reflect the true ratio, and the purpose is only to illustrate the present disclosure.

The liquid crystal display panel provided by the present disclosure, as shown in FIG. 2 to FIG. 20, may include:

a liquid crystal display structure 001 and a liquid crystal light control structure 002 that are overlaid, a first polarizer 003 located on one side of the liquid crystal display structure 001 facing away from the liquid crystal light control structure 002, and a second polarizer 004 located on one side of the liquid crystal light control structure 002 facing away from the liquid crystal display structure 001, where at least one of the first polarizer 003 and the second polarizer 004 has a light scattering structure 300.

In the liquid crystal display panel provided by an embodiment of the present disclosure, since at least one of the first polarizer 003 and the second polarizer 004 has a light scattering structure 300, the polarized light of the corresponding colors transmitted by the sub-pixel units of different colors in the liquid crystal display structure 001 can be uniformly diffused by the light scattering structure 300. That is to say, the light scattering structure 300 plays a role of uniformly mixing the polarized light of different colors to a certain extent. Therefore, the rainbow pattern phenomenon is effectively improved or even eliminated, and the display quality is improved.

Optionally, the liquid crystal display panel provided by an embodiment of the present disclosure, as shown in FIG. 2 to FIG. 20, may further include: a third polarizer 005 located between the liquid crystal display structure 001 and the liquid crystal light control structure 002.

In order to effectively improve the rainbow pattern, at least one of the first polarizer 003, the second polarizer 004, and the third polarizer 005 may be provided with a light scattering structure 300.

In order to facilitate the description of the technical solution of the present disclosure, the following detailed description will only be made by taking the example of the first polarizer 003 having the light scattering structure 300. In the case that the second polarizer 004 and the third polarizer 005 have the light scattering structure 300, reference may be made to the embodiment in which the first polarizer 003 has the light scattering structure 300, and repeated descriptions are omitted.

Optionally, in the above-mentioned liquid crystal display panel provided by an embodiment of the present disclosure, in order to improve the rainbow pattern without adding a new film layer to achieve a lighter and thinner design, a film layer of the polarizer may be doped with transparent particles to constitute a light scattering structure 300. And in order to effectively improve the rainbow pattern, the transparent particles can be evenly distributed in the film layer of the polarizer. Optionally, the shape of the transparent particles may be, but not limited to, spherical, tubular, or block. In addition, in order not to affect the inherent properties of each film layer in the polarizer in the related art, the particle size of the transparent particles is in a nanometer scale. The material of the transparent particles may be acrylic, silica, or other transparent materials known to those skilled in the art, which is not limited herein.

Therefore, in the liquid crystal display panel provided by an embodiment of the present disclosure, the polarizer having the light scattering structure 300 may include: a pressure-sensitive adhesive layer 301, a first optical film layer 302, a first adhesive layer 303, a polyvinyl alcohol film layer 304, a second adhesive layer 305 and a second optical film layer 306 that are sequentially overlaid; and the pressure-sensitive adhesive layer 301 is located between the first optical film layer 302 and the liquid crystal display structure 001 (as shown in FIG. 3 to FIG. 8), or between the first optical film layer 302 and the liquid crystal light control structure 002, where, at least one of the pressure-sensitive adhesive layer 301, the first optical film layer 302, the first adhesive layer 303, the polyvinyl alcohol film layer 304, the second adhesive layer 305, and the second optical film layer 306 is doped with transparent particles, and the film layer doped with transparent particles constitutes the light scattering structure 300.

Figure 3:
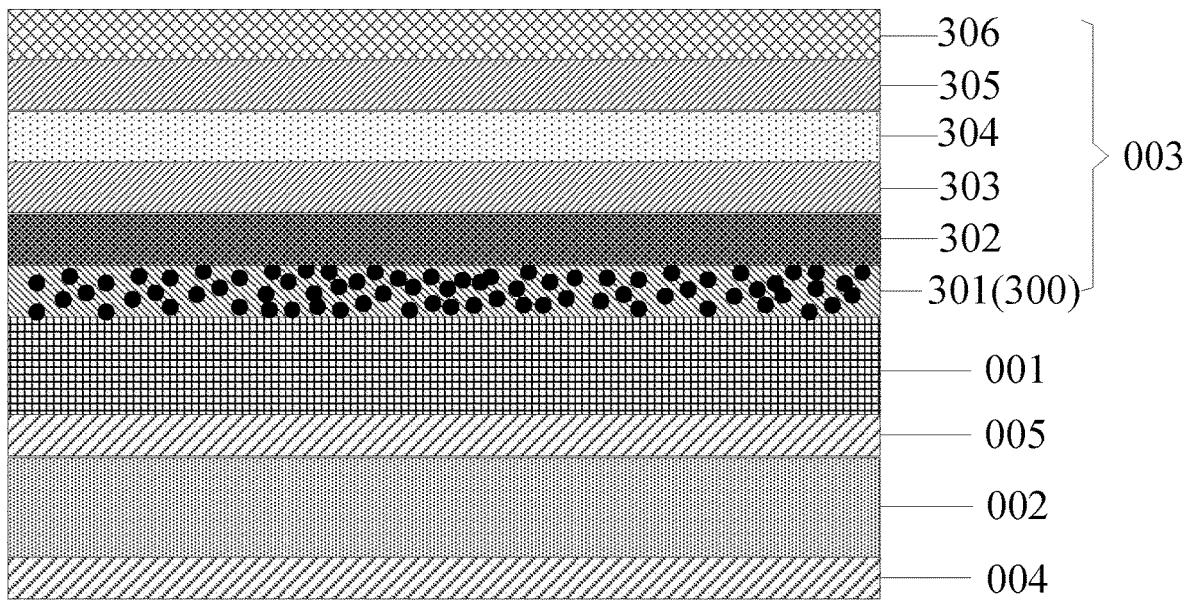
Figure 4:
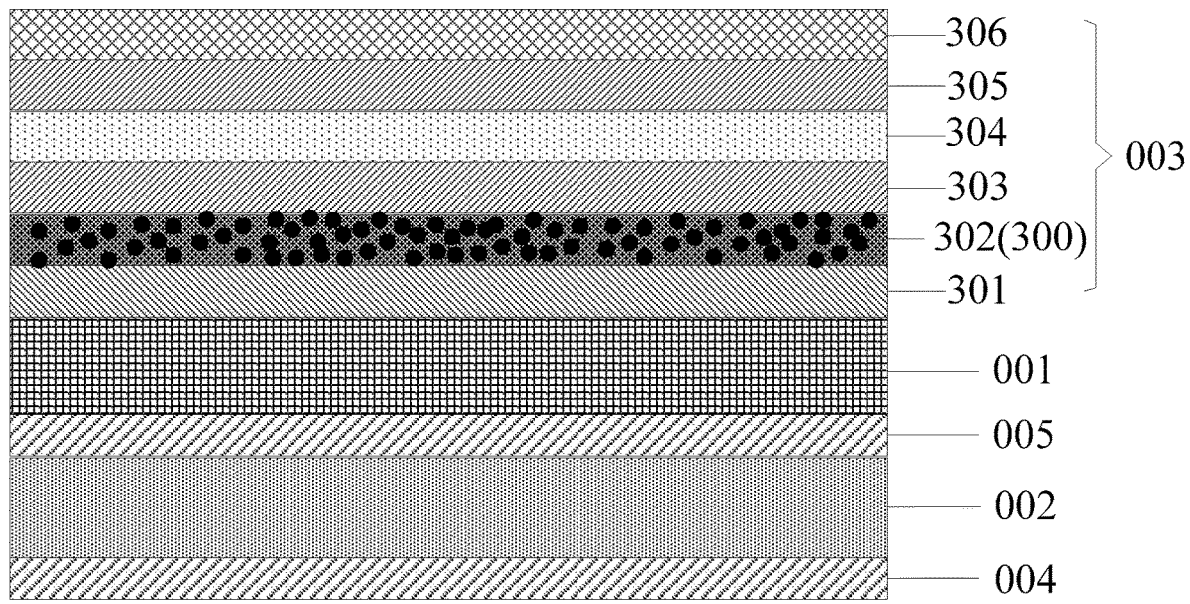
Figure 5:
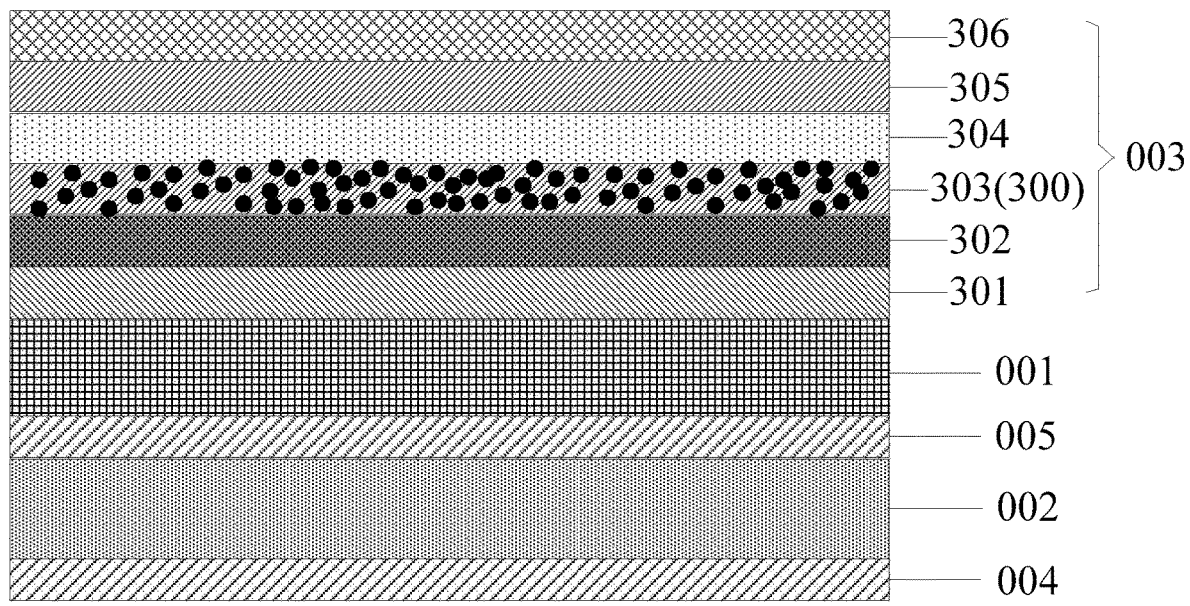
Figure 6:
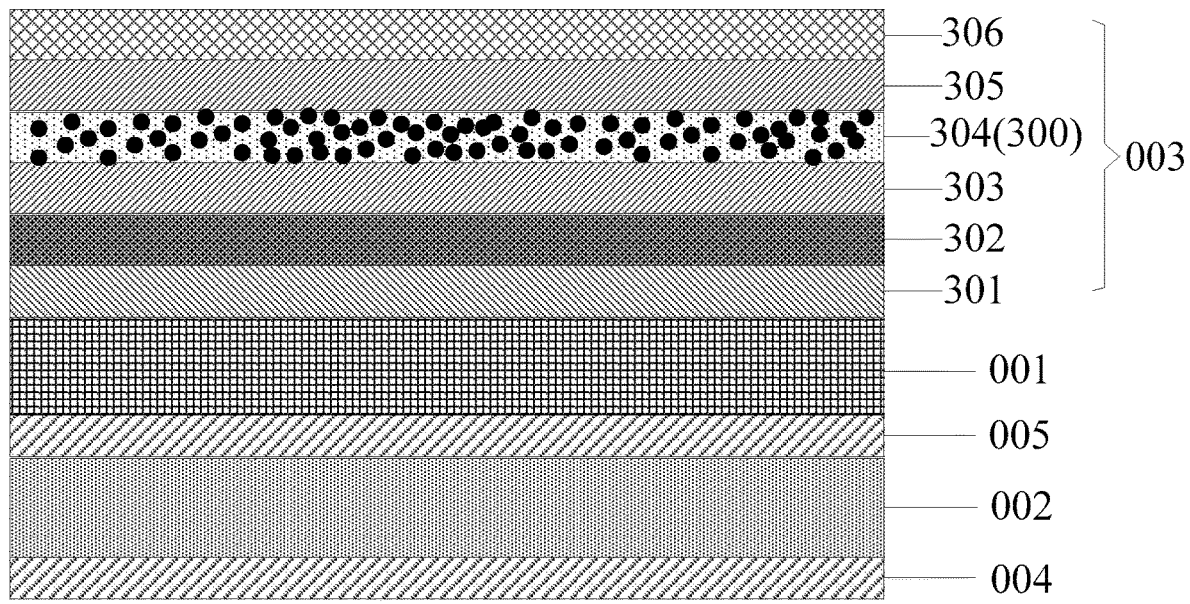
Figure 7:
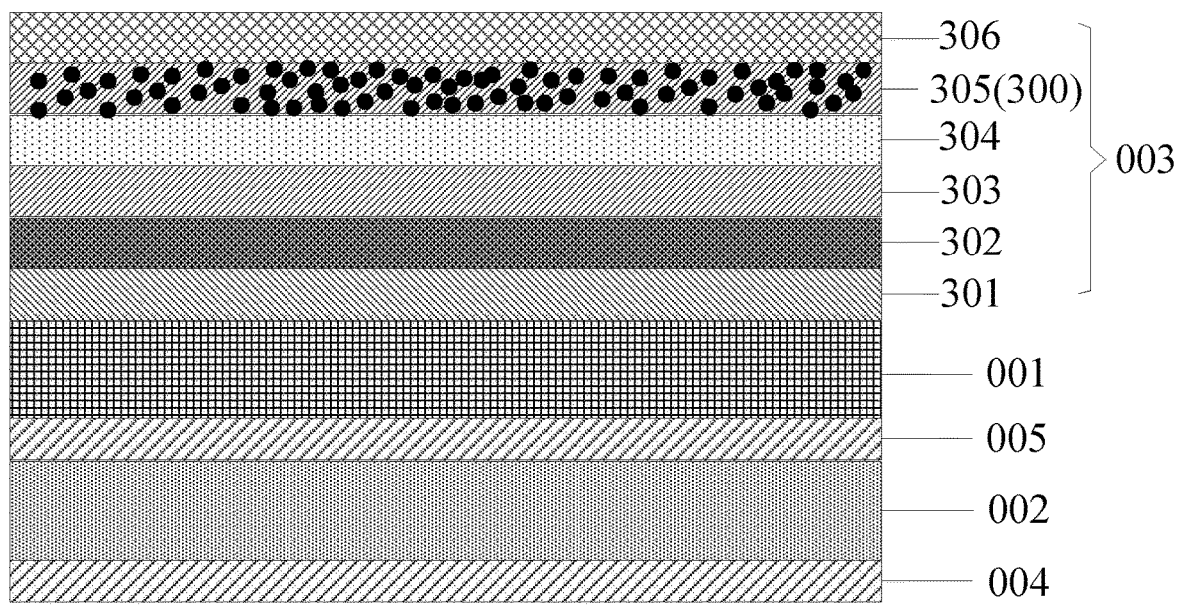
Figure 8:
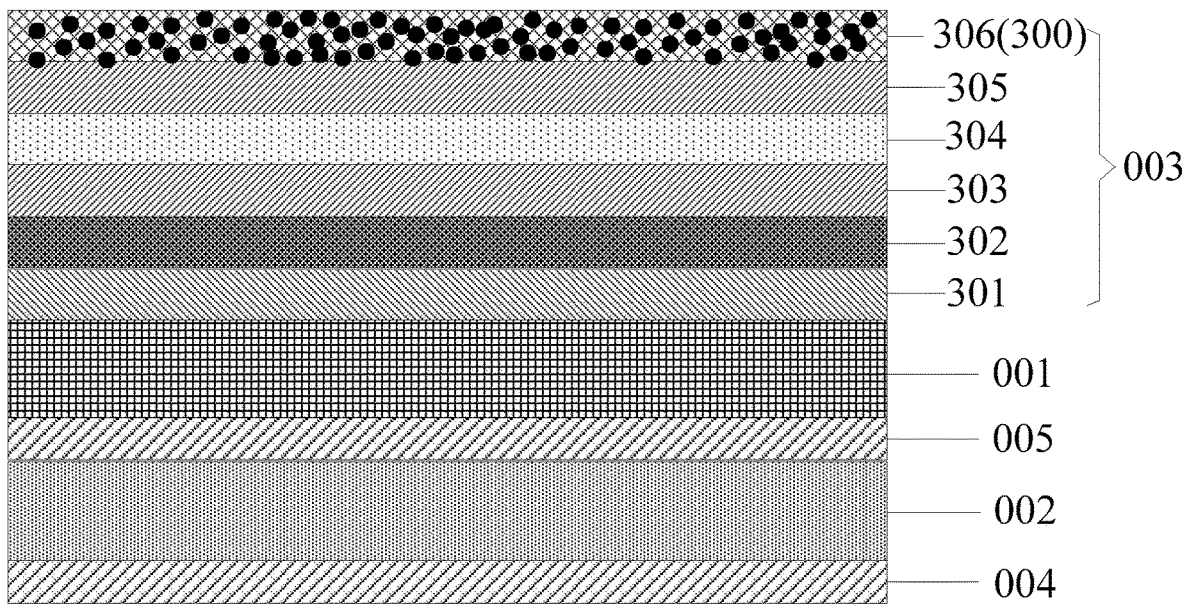

That is to say, in the liquid crystal display panel provided by an embodiment of the present disclosure, the pressure-sensitive adhesive layer 301 may be doped with transparent particles to constitute a light scattering structure 300, as shown in FIG. 3; alternatively, the first optical film layer 302 is doped with transparent particles to constitute a light scattering structure 300, as shown in FIG. 4; alternatively, the first adhesive layer 303 is doped with transparent particles to constitute a light scattering structure 300, as shown in FIG. 5; alternatively, the polyvinyl alcohol film layer 304 is doped with transparent particles to constitute a light scattering structure 300, as shown in FIG. 6; alternatively, the second adhesive layer 305 is doped with transparent particles to constitute a light scattering structure 300, as shown in FIG. 7; alternatively, the second optical film layer 306 is doped with transparent particles to constitute a light scattering structure 300, as shown in FIG. 8; alternatively, the embodiments in FIG. 3 to FIG. 8 can be arbitrarily combined under the condition of no conflict, that is, in order to effectively improve the rainbow pattern phenomenon, a plurality of film layers of the polarizer may be doped with transparent particles.

Optionally, in the liquid crystal display panel provided by an embodiment of the present disclosure, since backlight emitted from each sub-pixel unit in the liquid crystal display structure 001 sequentially passes through each film layer of the first polarizer 003, and emergent light has a smaller emergent angle in the film layer closer to each sub-pixel unit in the first polarizer 003, so that the light scattering structure 300 can better uniformly diffuse the emergent light, so as to more effectively improve the rainbow pattern phenomenon. On this basis, and for the purpose of cost saving, as shown in FIG. 3, only the pressure-sensitive adhesive layer 301 of the first polarizer 003 may be doped with transparent particles to constitute the light scattering structure 300.

Optionally, in the liquid crystal display panel provided by an embodiment of the present disclosure, in order to achieve the effect of improving or even eliminating the rainbow pattern phenomenon, the light scattering structure 300 can be not only a film layer doped with transparent particles in the polarizer, but also a newly added film layer in the polarizer. Specifically, the polarizer having the light scattering structure includes: a pressure-sensitive adhesive layer 301, a first optical film layer 302, a first adhesive layer 303, a polyvinyl alcohol film layer 304, a second adhesive layer 305 and a second optical film layer 306 that are successively overlaid; and the pressure-sensitive adhesive layer 301 is located between the first optical film layer 302 and the liquid crystal display structure 001 (as shown in FIG. 9 to FIG. 19), or between the first optical film layer 302 and the liquid crystal light control structure 002, where, the light scattering structure 300 may be located on one side of the second optical film layer 306 facing away from the second adhesive layer 305, and/or the light scattering structure 300 may be located between the pressure-sensitive adhesive layer 301 and the liquid crystal display structure 001, and/or the light scattering structure 300 may be located between at least a pair of two adjacent film layers among the pressure-sensitive adhesive layer 301, the first optical film layer 302, the first adhesive layer 303, the polyvinyl alcohol film layer 304, the second adhesive layer 305 and the second optical film layer 306.

Figure 9:
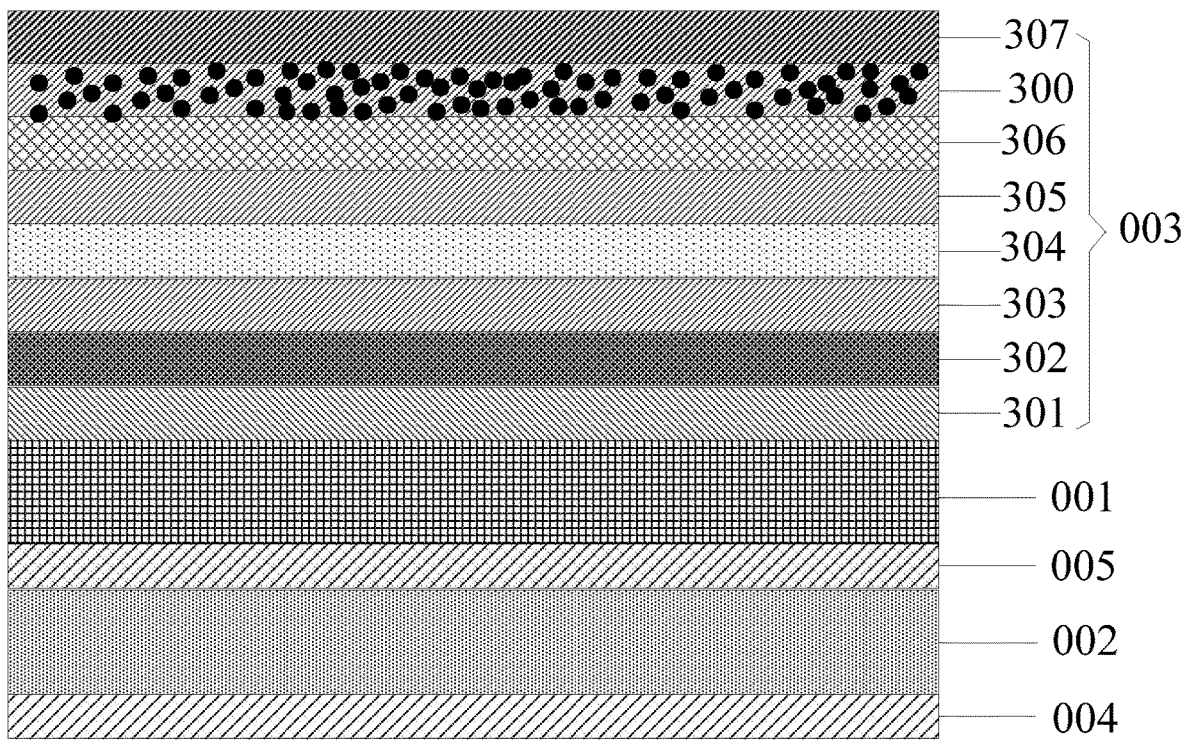
Figure 10:
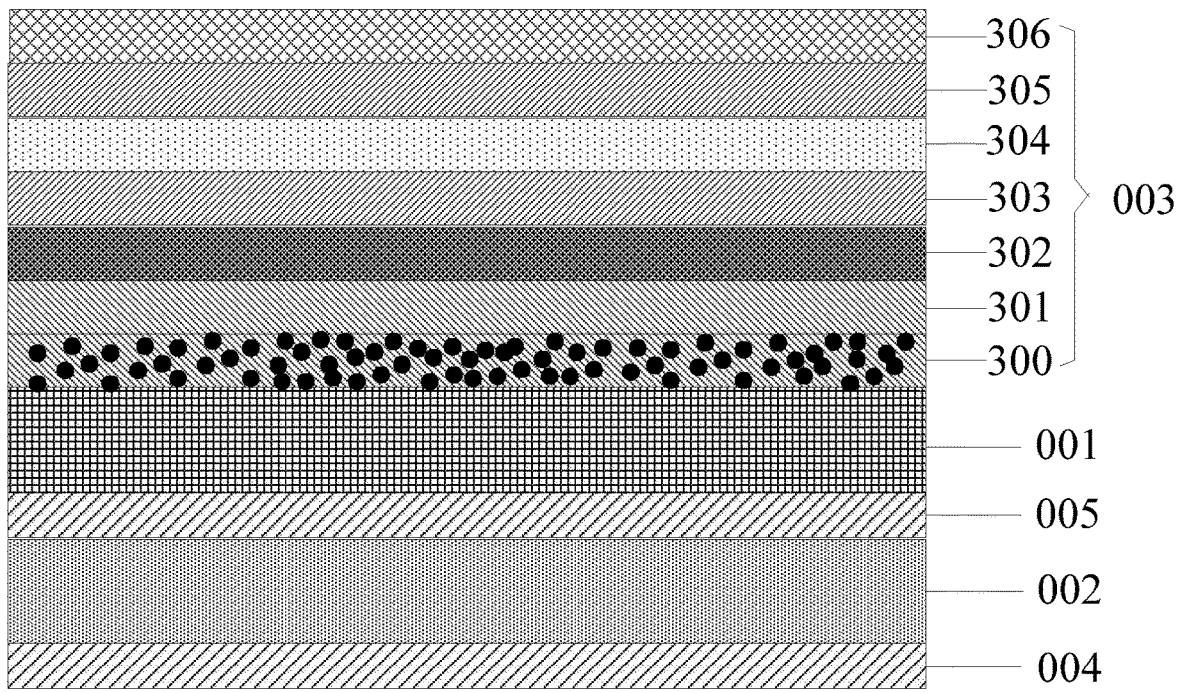
Figure 11:
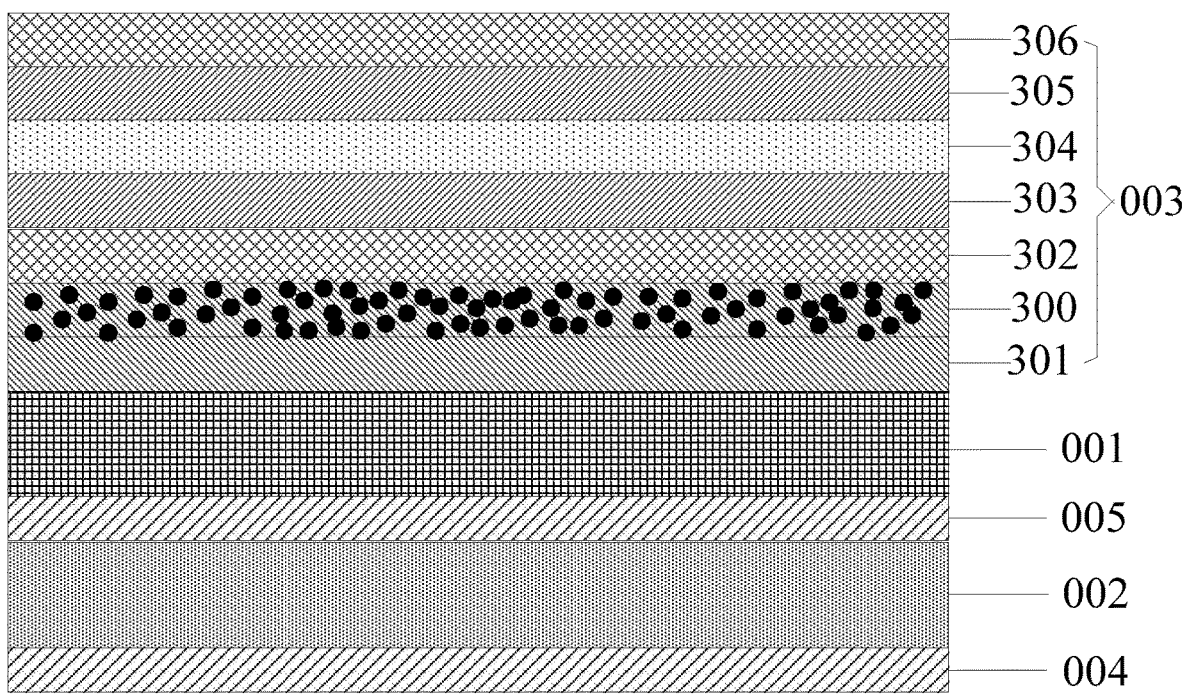
Figure 12:
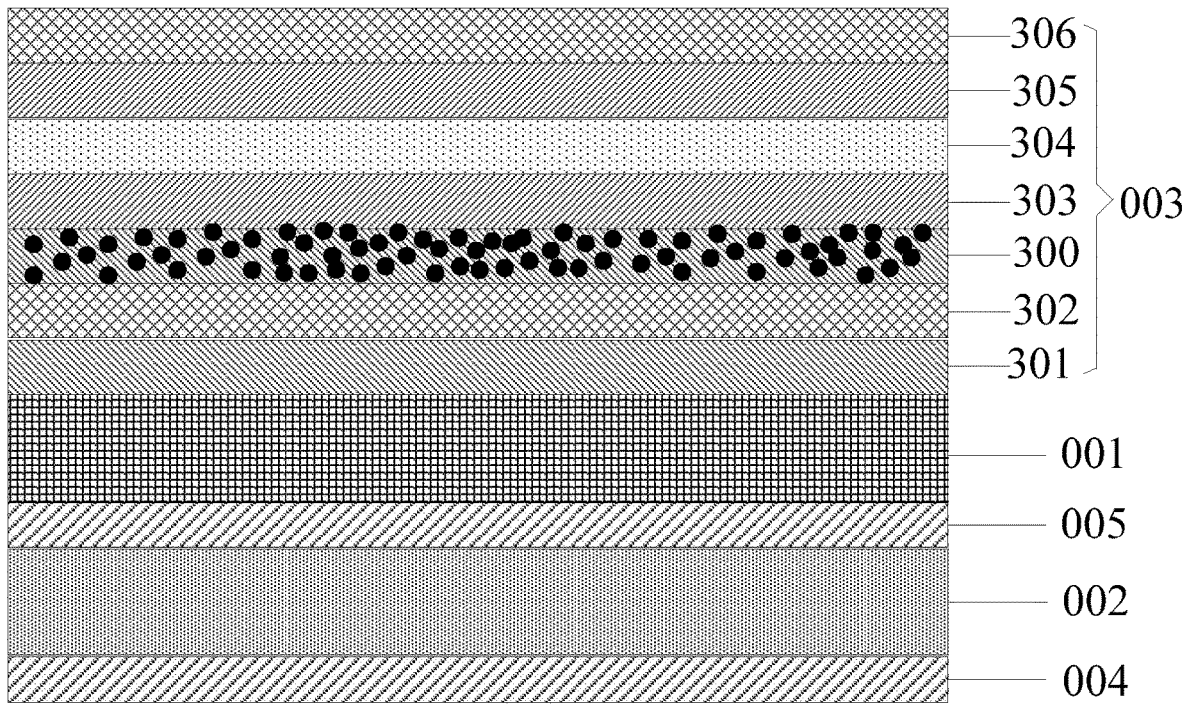
Figure 13:
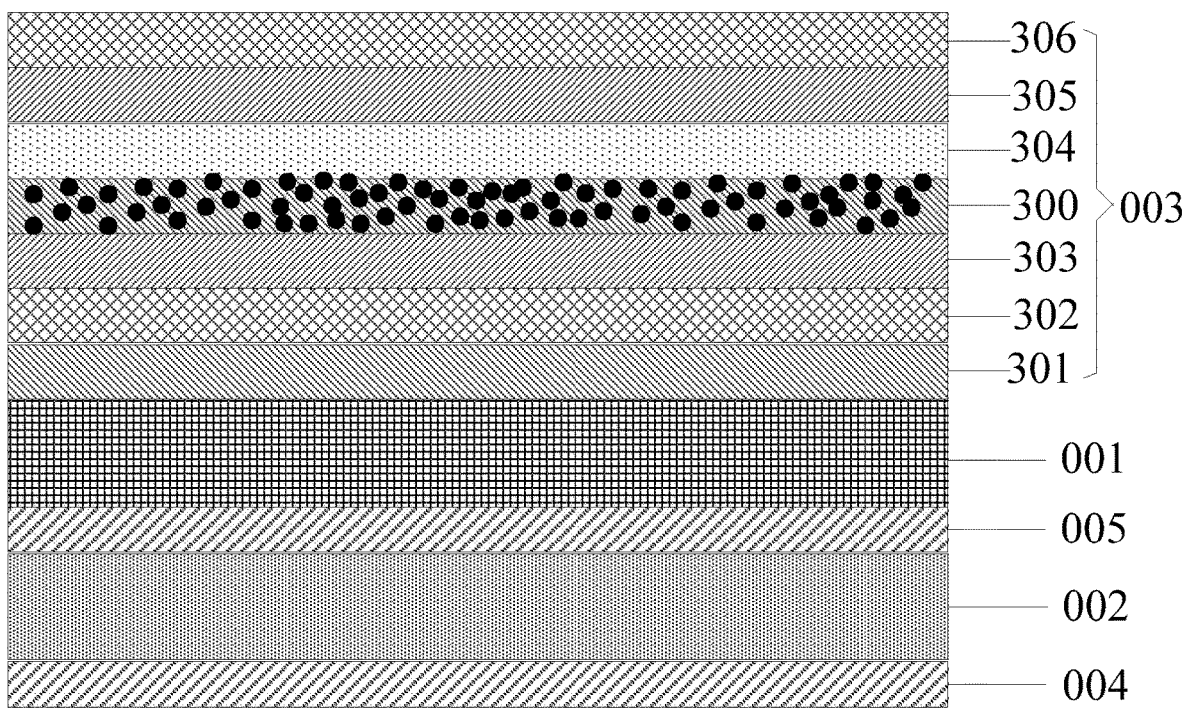
Figure 14:
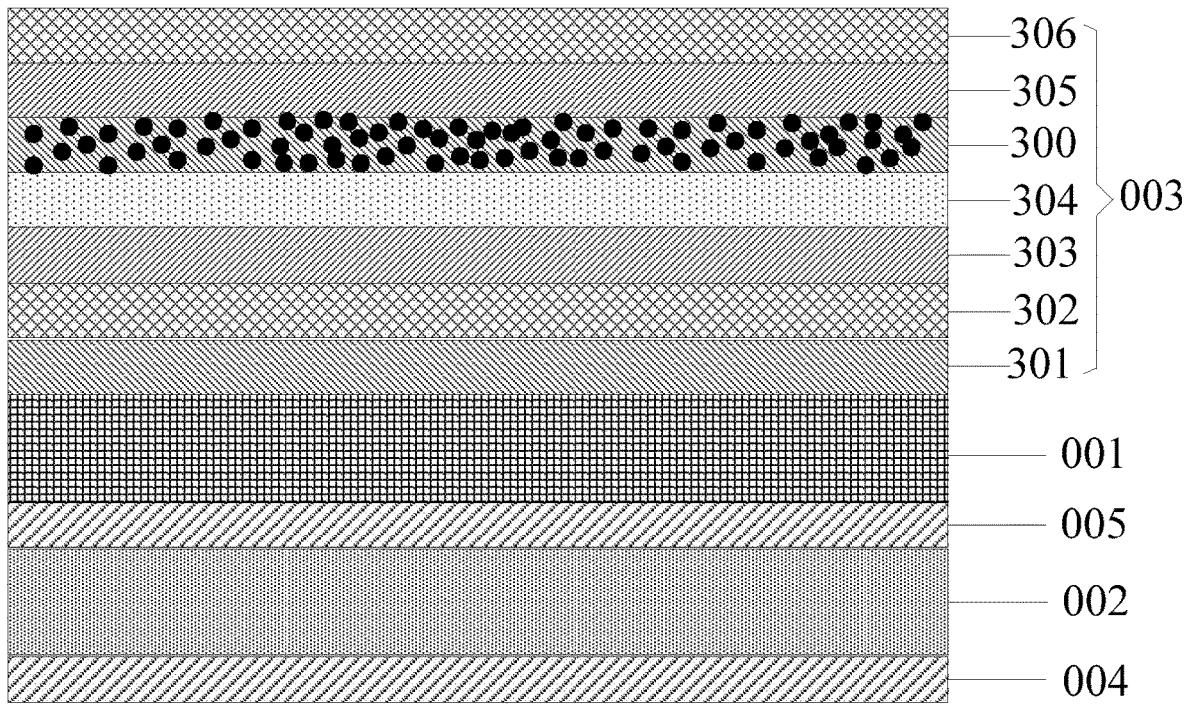
Figure 15:
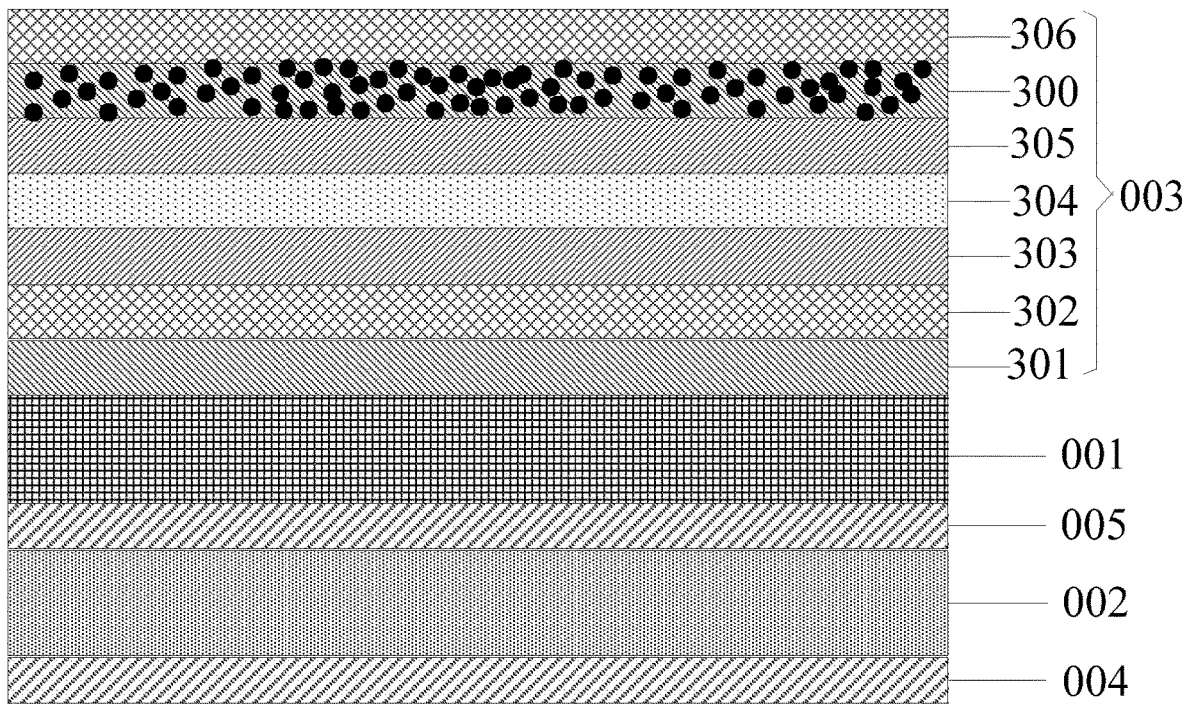
Figure 16:
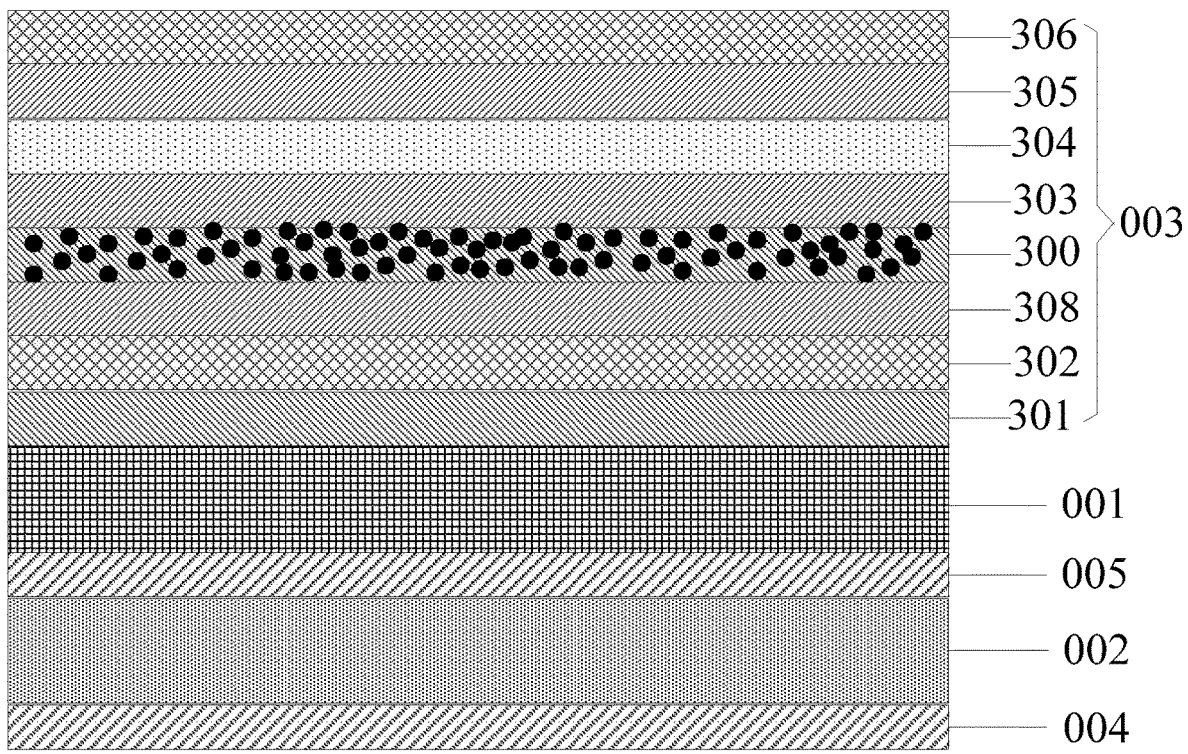
Figure 17:
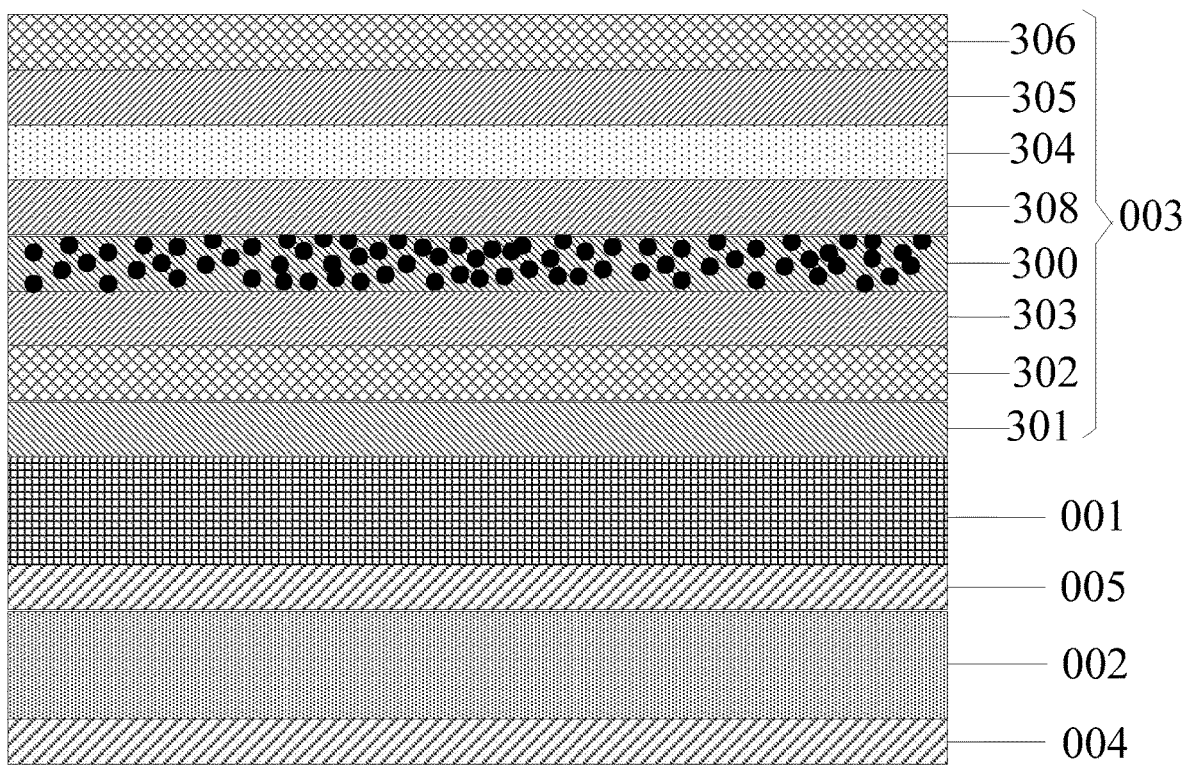
Figure 18:
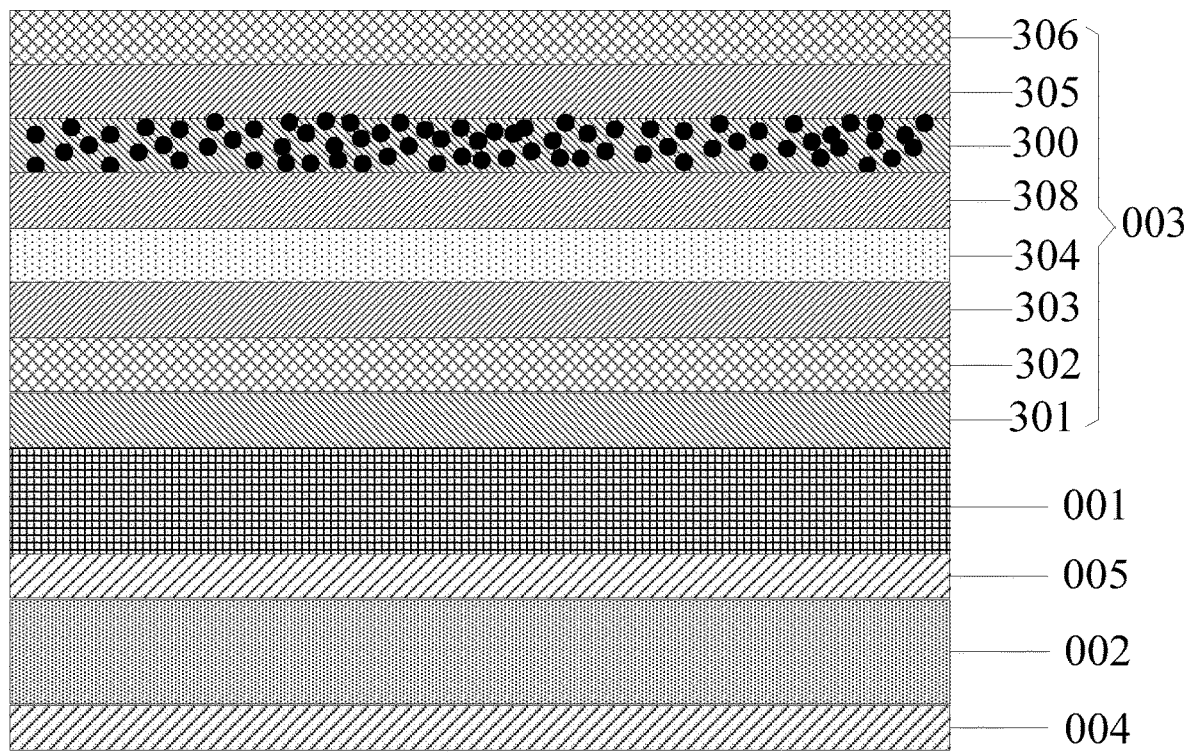
Figure 19:
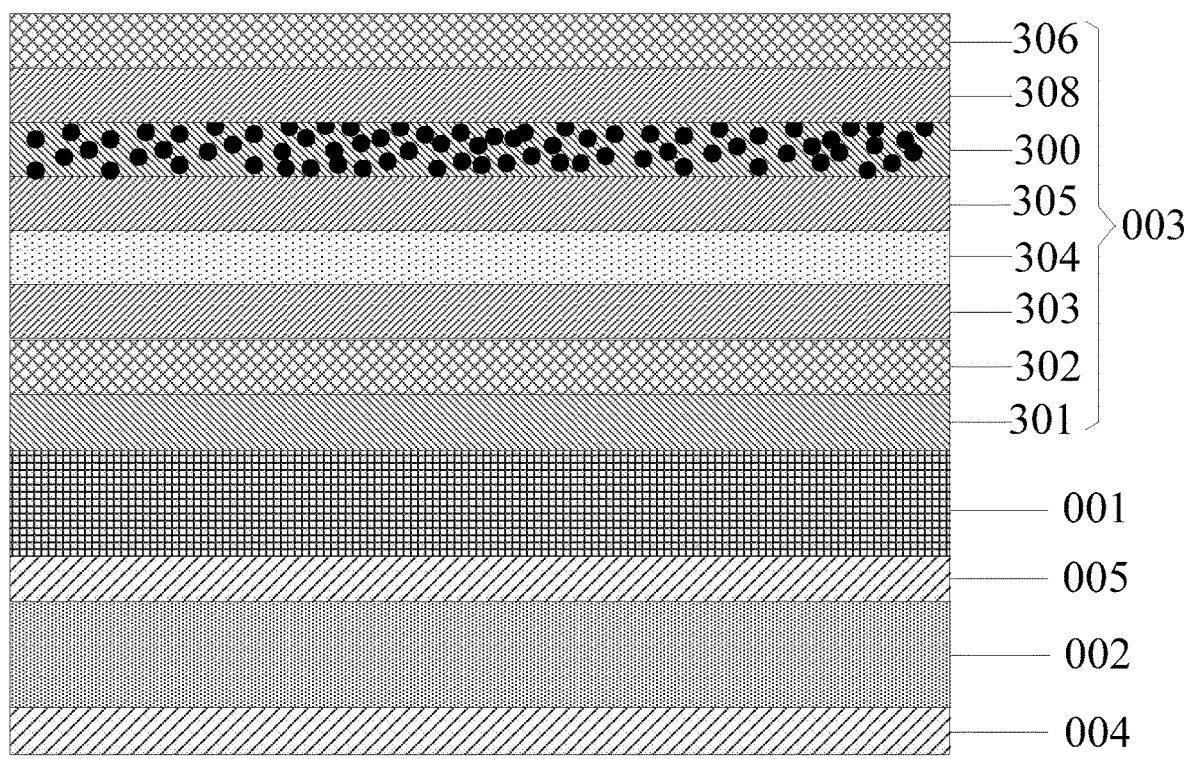

Specifically, in the liquid crystal display panel provided by an embodiment of the present disclosure, the light scattering structure 300 may be located on one side of the second optical film layer 306 facing away from the second adhesive layer 305, as shown in FIG. 9; alternatively, the light scattering structure 300 may be located between the pressure-sensitive adhesive layer 301 and the liquid crystal display structure 001, as shown in FIG. 10; alternatively, the light scattering structure 300 may be located between the pressure-sensitive adhesive layer 301 and the first optical film layer 302, as shown in FIG. 11; alternatively, the light scattering structure 300 may be located between the first optical film layer 302 and the first adhesive layer 303, as shown in FIG. 12; alternatively, the light scattering structure 300 may be located between the first adhesive layer 303 and the polyvinyl alcohol film layer 304, as shown in FIG. 13; alternatively, the light scattering structure 300 may be located between the polyvinyl alcohol film layer 304 and the second adhesive layer 305, as shown in FIG. 14; alternatively, the light scattering structure 300 may be located between the second adhesive layer 305 and the second optical film layer 306, as shown in FIG. 15; alternatively, the embodiments of FIG. 9 to FIG. 15 can be arbitrarily combined under the condition of no conflict. It can be understood that, in order to obtain a better effect of improving the rainbow pattern, the embodiments of FIG. 3 to FIG. 15 can also be arbitrarily combined under the condition of no conflict.

It is noted that for the case of FIG. 9 where the light scattering structure 300 is located as a single film layer on one side of the second optical film layer 306 facing away from the second adhesive layer 305: in specific implementation, the light scattering structure 300 may be a part of the polarizer as described above; the light scattering structure 300 may also be regarded as a component independent of the polarizer, which is not limited herein. Similarly, for the case of FIG. 10 where the light scattering structure 300 is located between the pressure-sensitive adhesive layer 301 and the liquid crystal display structure 001: in specific implementation, the light scattering structure 300 may be a part of the polarizer as described above; the light scattering structure 300 may also be regarded as an isolated component between the liquid crystal display structure 001 and the polarizer, which is not limited herein.

Optionally, in the liquid crystal display panel provided by an embodiment of the present disclosure, when the light scattering structure 300 is a newly added film layer, the light scattering structure 300 may include: an adhesive, and transparent particles dispersed in the adhesive; alternatively, the light scattering structure 300 may also be a film layer constituted by transparent particles. In specific implementation, the light scattering structure 300 constituted by transparent particles may be manufactured by an extrusion process or other film forming processes in the related art.

Optionally, in the liquid crystal display panel provided by an embodiment of the present disclosure, when the light scattering structure 300 includes an adhesive and transparent particles dispersed in the adhesive, in order to prevent the light scattering structure 300 from sticking together with other items in the application environment during the use of a product to affect the display effect, as shown in FIG. 9, the polarizer having the light scattering structure 300 may further include: a transparent protective film 307 located on one side of the light scattering structure 300 facing away from the second optical film layer 306.

Optionally, in the liquid crystal display panel provided by an embodiment of the present disclosure, in order to fix the light scattering structure 300, under the condition that the light scattering structure 300 is a film layer constituted by transparent particles, and one side of the light scattering structure 300 is in contact with the first adhesive layer 303 or the second adhesive layer 305, the polarizer having the light scattering structure 300 may further include: a third adhesive layer 308 in contact with the other side of the light scattering structure 300, as shown in FIG. 16 to FIG. 19. Optionally, in the liquid crystal display panel provided by an embodiment of the present disclosure, in order to effectively improve the rainbow pattern, the thickness of the light scattering structure 300 is at least in a nanometer scale. Specifically, when the light scattering structure 300 is a newly added film layer, the thickness of the light scattering structure 300 is at or above the nanometer scale; when the film layer in the polarizer is doped with transparent particles to constitute the light scattering structure 300, the thickness of the light scattering structure 300 is the same as or similar to the thickness of the corresponding film layer in the related art before the polarizer is doped with transparent particles.

Optionally, in the liquid crystal display panel provided by an embodiment of the present disclosure, the haze value of the polarizer having the light scattering structure 300 may be range from 5% to 100%, for example, 25%, 20%, 55%, or 60%, thereby achieving the effective improvement of the rainbow pattern.

Optionally, in the liquid crystal display panel provided by an embodiment of the present disclosure, the improvement effect on the rainbow pattern is not good in the case where the haze value of the light scattering structure 300 is low (e.g., 5%); in the case where the haze value is high (e.g., 100%), the rainbow pattern can be effectively improved, but the transmittance of the liquid crystal display panel may be affected. Therefore, in order to improve both the rainbow pattern phenomenon and the transmittance, the haze value of the polarizer having the light scattering structure 300 may be range from 40% to 80%, for example, 60%.

Accordingly, for the liquid crystal display panel provided by an embodiment of the present disclosure, Table 1 shows data related to the improvement of the rainbow pattern after the light scattering structure 300 is provided in the first polarizer 003, the third polarizer 005, the combination of the first polarizer 003 and the third polarizer 005, and the combination of the second polarizer 004 and the third polarizer 005.

In Table 1, Type A represents that the light scattering structure 300 is disposed on one side of the second optical film 306 facing away from the second adhesive layer 305, and Type B represents that the light scattering structure 300 constitutes of a pressure-sensitive adhesive layer 301 doped with transparent particles. The haze value represents the haze value of the polarizer having the light scattering structure 300. Haze is expressed as the percentage of transmitted light intensity that deviates from incident light by more than an angle of 2.5° to the total transmitted light intensity. Generally, the concept of haze can be understood as the ability to scatter light. In the present disclosure, since the volume and mass of the nano-scale transparent particles can be neglected, the amount of transparent particles contained in the light scattering structure 300 can be considered by the haze value. The larger the haze value, the more transparent particles contained. The smaller the value of the level L of the rainbow pattern, the less visible the rainbow pattern.

It can be seen from Table 1 that the closer the light scattering structure 300 is to the surface of the liquid crystal display structure 001, the better the effect of improving the rainbow pattern is, which is specifically expressed by the smaller the value of the level L of the rainbow pattern in the table. At the same time, it can be seen by comparison that Type B when the light scattering structure 300 constitutes of a pressure-sensitive adhesive layer 301 doped with transparent particles has better effect of improving the rainbow pattern, as compared with Type A when the light scattering structure 300 is located on one side of the second optical film 306 facing away from the second adhesive layer 305. In addition, in the light scattering structure 300 constituted by doping transparent particles in the pressure-sensitive adhesive layer 301 of the first polarizer 003 and having a haze value of 60%, 55%, and 40%, respectively, the light scattering structure 300 having a higher haze value improves the rainbow pattern better. In addition, the pressure-sensitive adhesive layer 301 of the first polarizer 003 is doped with transparent particles to constitute the light scattering structure 300 having a haze value of 60%, which not only can significantly improve the rainbow pattern phenomenon, but also has a high contrast.

TABLE 1

| Type | Haze value | Position | Rainbow pattern | Contrast |
|---|---|---|---|---|
| A | 25% | First polarizer | L2.5 | ~140,000 |
|  |  | Second polarizer | L3 | ~140,000 |
|  |  | First polarizer + Second polarizer | L2 | ~140,000 |
|  |  | Second polarizer + Third polarizer | L3 | ~140,000 |
| B | 60% | First polarizer | L0.5 | ~133,000 |
|  |  | Second polarizer | L1.5 | ~70,000 |
|  | 55% | First polarizer | L0.5 | ~133,000 |
|  | 40% | First polarizer | L1~1.5 | ~133,000 |

Optionally, in the liquid crystal display panel provided by an embodiment of the present disclosure, a material of at least one of the first optical film layer 302 and the second optical film layer 306 may be triacetyl cellulose (TAC), polyethylene terephthalate (PET), acrylic acid or cycloolefin polymer, which is not limited herein.

Optionally, in the liquid crystal display panel provided by an embodiment of the present disclosure, to ensure the polarizing effect and weather resistance of a polarizer, a material of the first optical film 302 of the first polarizer 003, the first optical film and the second optical film of the third polarizer 005, and the first optical film of the second polarizer 004 is triacetyl cellulose; and a material of the second optical film 306 of the first polarizer 003 and the second optical film of the second polarizer 004 is polyethylene terephthalate, acrylic or cycloolefin polymer, respectively.

It can be understood that, in the related art, in order to facilitate the storage and transportation of a polarizer, a release film is generally provided on one side of the pressure-sensitive adhesive layer facing away from the first optical film. When a polarizer is specifically applied to a terminal product, the release film is torn off, and bonded with the liquid crystal display structure or the liquid crystal light control structure through the pressure-sensitive adhesive layer. When the pressure-sensitive adhesive layer is doped with transparent particles to constitute the light scattering structure, the pressure-sensitive adhesive layer is doped with transparent particles that make it more viscous, so that the pressure-sensitive adhesive layer may be damaged while tearing off the release film. In this way, the function of the light scattering structure to improve the rainbow pattern will be weakened or even eliminated, making the polarizer a waste film.

Figure 20:
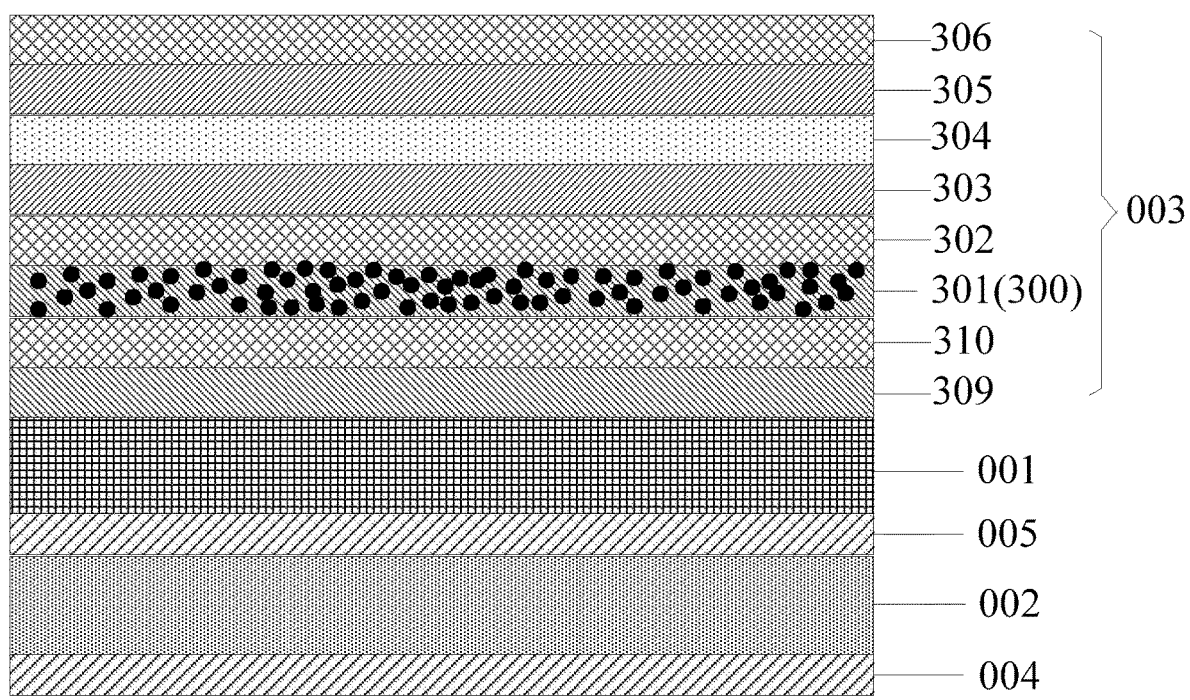

Therefore, in order to enhance the rework during maintenance of a polarizer, optionally, in the liquid crystal display panel provided in an embodiment of the present disclosure, when the pressure-sensitive adhesive layer 301 is doped with transparent particles to constitute the light scattering structure 300, the polarizer having the light scattering structure may further include:

a fourth adhesive layer 309 located on one side of the pressure-sensitive adhesive layer 301 facing away from the first optical film layer 302, and a third optical film layer 310 between the fourth adhesive layer 309 and the pressure-sensitive adhesive layer 301, as shown in FIG. 20.

Therefore, before attaching the polarizer to the liquid crystal display structure 001 or the liquid crystal light control structure 002, the fourth adhesive layer 309 and the third optical film layer 310 are overlaid between the release film and the light scattering structure 300 constituted by the pressure-sensitive adhesive layer 301 doped with transparent particles, so that in the process of tearing off the release film, the light scattering structure 300 constituted by the pressure-sensitive adhesive layer 301 doped with transparent particles is protected by the third optical film layer 310; and after tearing off the release film, attachment between the polarizer and the liquid crystal display structure 001 or the liquid crystal light control structure 002 is realized by the fourth adhesive layer 309. Therefore, the rework of the polarizer during maintenance is enhanced, and the cost is saved.

Optionally, in the liquid crystal display panel provided by an embodiment of the present disclosure, a material of the third optical film layer 310 may be triacetyl cellulose (TAC), polyethylene terephthalate (PET), acrylic acid or cycloolefin polymer, which is not limited herein. Moreover, in practical applications, the third optical film 310 is preferably made of triacetyl cellulose (TAC).

It should be noted that, in the liquid crystal display panel provided by an embodiment of the present disclosure, a material of the first adhesive layer 303, the second adhesive layer 305, the third adhesive layer 308, and the fourth adhesive layer 309 may be adhesives with good light transmittance such as ultraviolet (UV) adhesive, hydrogel, pressure-sensitive adhesive, etc., which are not limited herein.

Figure 21:
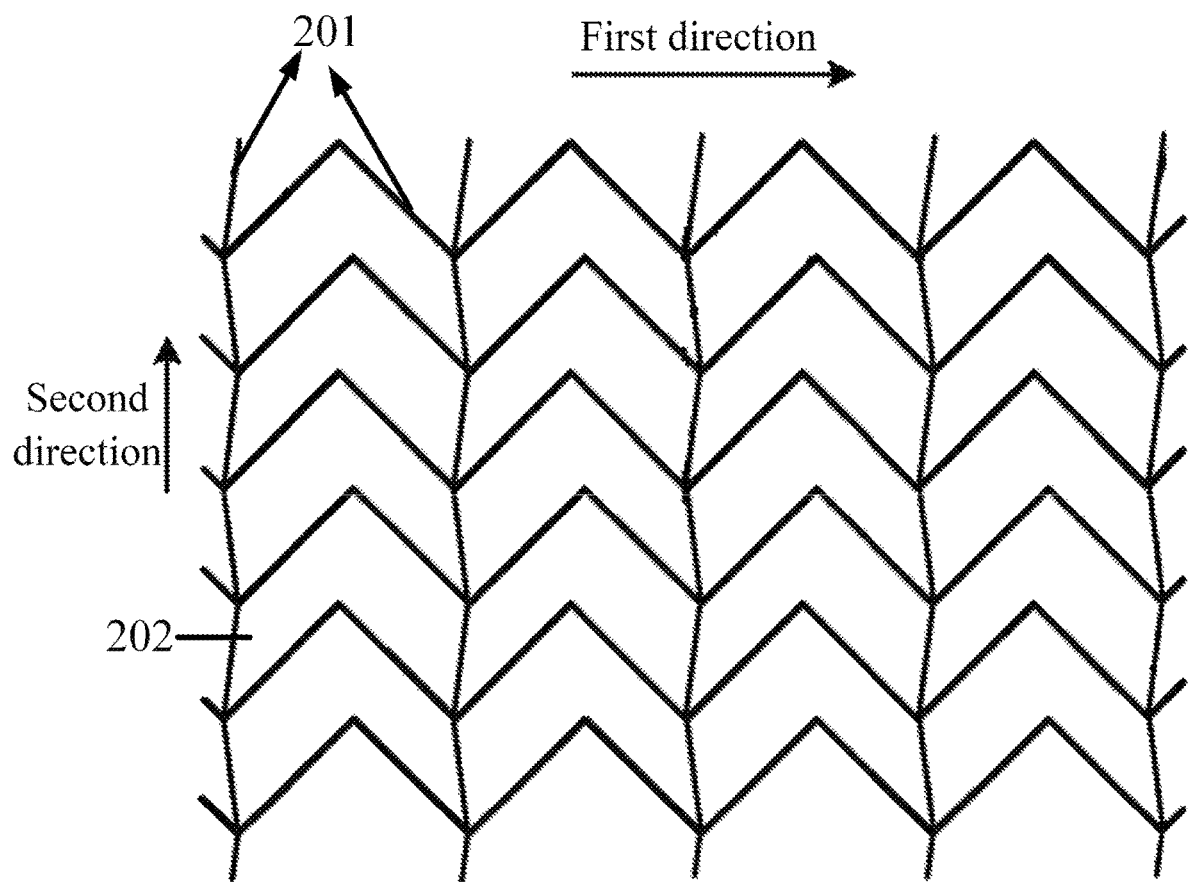
FIG. 21 and FIG. 22, respectively, are schematic diagrams of a top view of a liquid crystal light control structure provided by an embodiment of the present disclosure.
Figure 22:
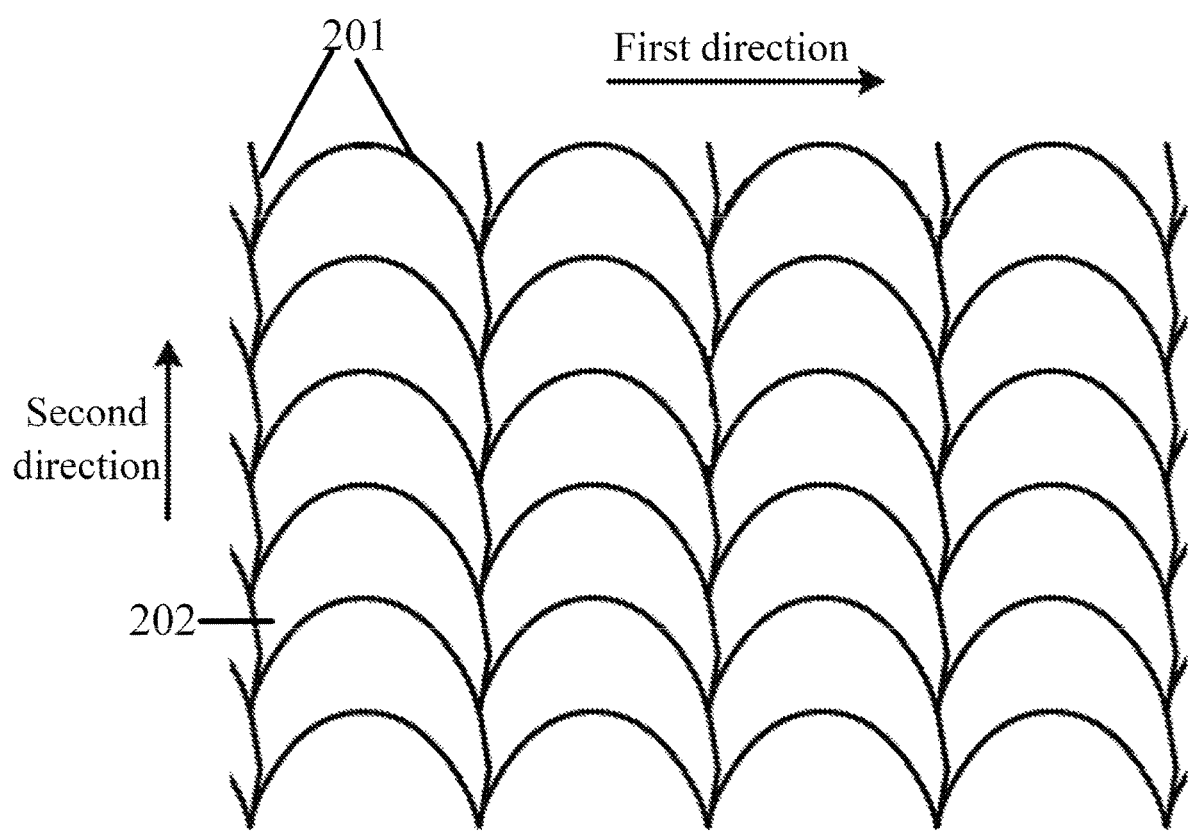

Optionally, in the liquid crystal display panel provided in an embodiment of the present disclosure, as shown in FIG. 21 and FIG. 22, the liquid crystal light control structure 002 includes: a plurality of signal lines 201 extending along a first direction and a second direction crossing each other, where the signal lines are fold lines. The signal lines extending along the first direction and the second direction are fold lines, so that grids formed by the signal lines extending along the first direction and the second direction do not have same or similar patterns as grids formed by the gate lines and the data lines in the liquid crystal display structure 001. Therefore, it can effectively improve the effect of eliminating moiré, and is simple in structure and easy to manufacture. On this basis, the liquid crystal display panel provided by an embodiment of the present disclosure can control the direction or the strength of the backlight incident on the liquid crystal display structure 001, and does not need to additionally add a film layer specially used for eliminating moiré to achieve a better effect of eliminating moiré.

Optionally, in the liquid crystal display panel provided by an embodiment of the present disclosure, the liquid crystal display structure 001 includes: gate lines extending along the first direction, and first light-shielding lines, wherein the gate lines overlap with the first light-shielding lines in a direction perpendicular to the liquid crystal display panel;

the liquid crystal light control structure 002 includes: second light-shielding lines, wherein the signal lines extending along the first direction overlap with the second light-shielding lines in the direction perpendicular to the liquid crystal display panel; and to effectively eliminate moiré, the ratio of the width of the first light-shielding line to the width of the second light-shielding line ranges from 2.5 to 4.

Optionally, in the liquid crystal display panel provided by an embodiment of the present disclosure, the width of the first light-shielding line ranges from 100 μm to 120 μm, and the width of the second light-shielding line ranges from 30 μm to 40 μm.

It should be noted that the first light-shielding line is a part of a black matrix in the liquid crystal display structure 001; the second light-shielding line is a part of a black matrix in the liquid crystal light control structure 002.

Optionally, in the liquid crystal display panel provided by an embodiment of the present disclosure, as shown in FIG. 21 and FIG. 22, the liquid crystal light control structure 002 further includes: a plurality of light control units 202 defined by the signal lines 201;

the liquid crystal display structure 001 includes a plurality of grid lines (which can be specifically gate lines and data lines) extending along the first direction and the second direction crossing each other, where the grid lines define a plurality of sub-pixel units, and the N sub-pixel units arranged continuously along the first direction constitute a pixel unit, where N is a positive integer;

a plurality of the pixel units and the plurality of light control units 202 are respectively arranged in an array; and along the first direction, the maximum length of one of the light control units 202 is m times the length of one of the pixel units; along the second direction, the width of one of the light control units 202 is n times the width of one of the pixel units; m and n are both positive integers. That is, the maximum length of one light control unit 202 in the first direction is equal to the sum of the lengths of m consecutively arranged pixel units; the width of one light control unit 202 in the second direction is equal to the sum of the widths of n consecutively arranged pixel units. This allows one light control unit 202 to correspond to m*n consecutively arranged pixel units (i.e., continuous m columns and n rows of pixel units), for example, in a direction perpendicular to the display surface of the display device, the starting position and ending position of each light control unit 202 are also the starting position and ending position of a corresponding combination of m*n consecutively arranged pixel units.

On the basis of the same inventive concept, an embodiment of the present disclosure provides a display device, including: the above-mentioned liquid crystal display panel. The display device can be applied to any product or component with a display function, such as a mobile phone, a tablet personal computer, a television, a display, a notebook computer, a digital photo frame, a navigator and the like.

Since the principle of the display device to solve the problem is similar to that of the liquid crystal display panel, the implementation of the display device can refer to the implementation of the liquid crystal display panel, and repeated descriptions are omitted.

Figure 23:
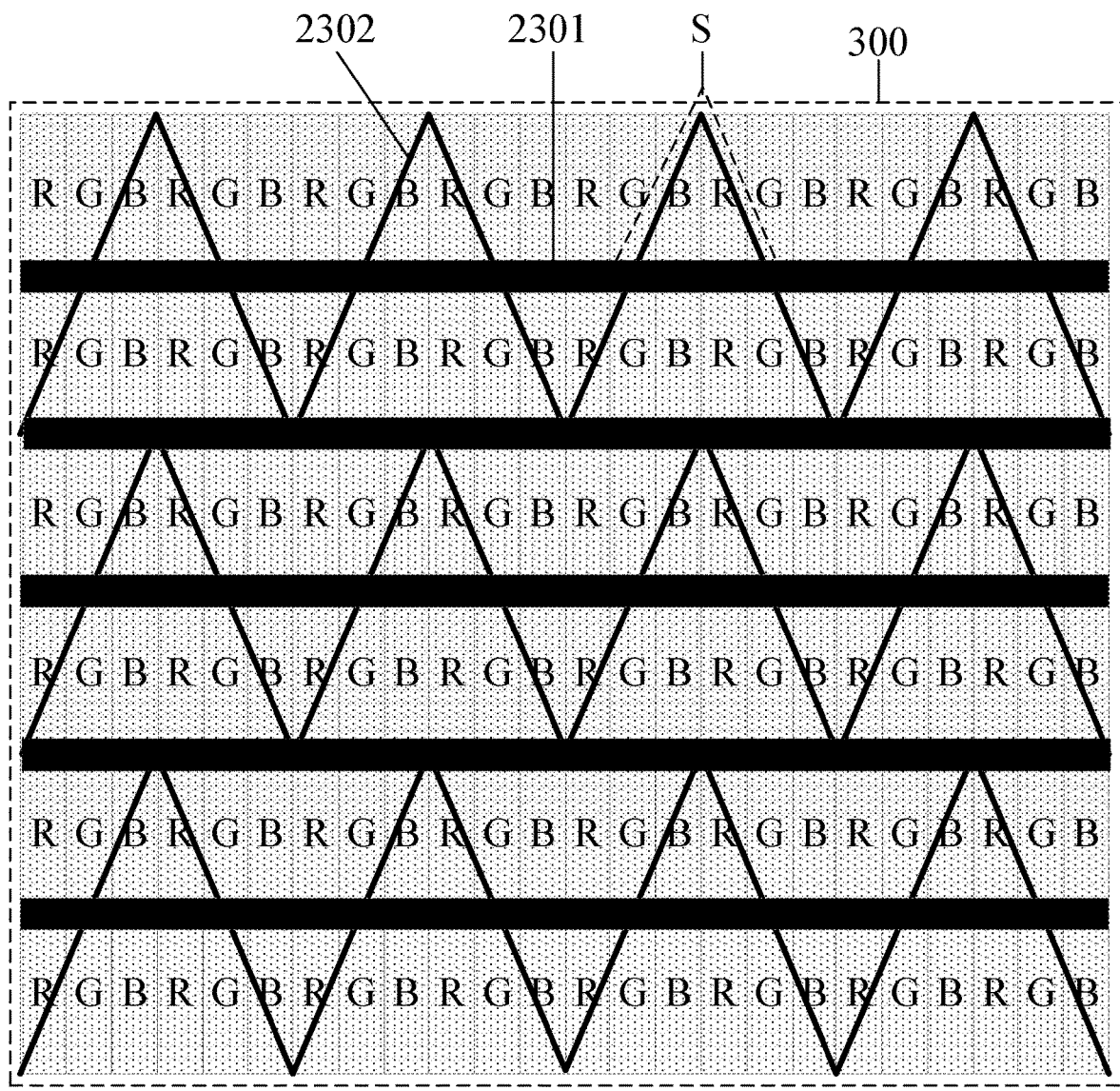
FIG. 23 is a schematic diagram of a top view of another liquid crystal display panel provided by embodiments of the present disclosure.

On the basis of the same inventive concept, an embodiment of the present disclosure provides another liquid crystal display panel, as shown in FIG. 23, including: a liquid crystal display structure and a liquid crystal light control structure that are overlaid;

the liquid crystal display structure includes: first gate lines (not shown) extending along a first direction, and first light-shielding lines 2301, where the first gate lines overlap with the first light-shielding lines 2301 in a direction perpendicular to the liquid crystal display panel;

the liquid crystal light control structure includes: second gate lines (not shown) extending along the first direction, and second light-shielding lines 2302, where the second gate lines overlap with the second light-shielding lines 2302 in the direction perpendicular to the liquid crystal display panel, and the second gate lines are a fold line;

a first orthographic projection of the first light-shielding line 2301 in the direction perpendicular to the liquid crystal display panel at least partially overlaps with a second orthographic projection of the second light-shielding line 2302 in the direction perpendicular to the liquid crystal display panel; and the liquid crystal display panel further includes: a light scattering structure 300 located in an enclosed area S of the first orthographic projection and the second orthographic projection.

It should be noted that the light scattering structure 300 may be located in any film layer in the enclosed area S, or may be added as an independent film layer at any position from top to bottom in the liquid crystal display panel, which is not limited herein. In addition, the first light-shielding line 2301 is a part of a black matrix in the liquid crystal display structure 001; the second light-shielding line 2302 is a part of a black matrix in the liquid crystal light control structure 002.

In the liquid crystal display panel provided by an embodiment of the present disclosure, by using the light scattering structure 300 located in the enclosed area S of the first orthographic projection of the first light-shielding line 2301 in the direction perpendicular to the liquid crystal display panel and the second orthographic projection of the second light-shielding line 2302 in the direction perpendicular to the liquid crystal display panel, the light emitted by the sub-pixels inducing the rainbow pattern phenomenon can be diffused, so that the brightness of the light (such as blue light) emitted by the sub-pixels is weakened to a certain extent, thereby improving the rainbow pattern phenomenon.

Optionally, in the liquid crystal display panel provided by an embodiment of the present disclosure, in order to enhance the effect of improving the rainbow pattern, as shown in FIG. 23, the light scattering structure 300 may be further located in a display area other than the enclosed area of the first orthographic projection of the first light-shielding line 2301 in the direction perpendicular to the liquid crystal display panel and the second orthographic projection of the second light-shielding line 2302 in the direction perpendicular to the liquid crystal display panel. That is to say, the light scattering structure 300 covers the display area of the liquid crystal display panel, so that the emergent light of each sub-pixel is uniformly diffused, thereby improving the color uniformity of the liquid crystal display panel, effectively improving or even eliminating the rainbow pattern phenomenon, and improving the display quality.

Optionally, in the liquid crystal display panel provided by an embodiment of the present disclosure, a shape of the enclosed area of the first orthographic projection of the first light-shielding line 2301 in the direction perpendicular to the liquid crystal display panel and the second orthographic projection of the second light-shielding line 2302 in the direction perpendicular to the liquid crystal display panel is a triangle (as shown in FIG. 23) or a semicircle. Of course, a shape of the enclosed area of the first orthographic projection of the first light-shielding line 2301 in the direction perpendicular to the liquid crystal display panel and the second orthographic projection of the second light-shielding line 2302 in the direction perpendicular to the liquid crystal display panel may also be other shapes, and specifically, the shape relates to the orthographic projection shape of the second light-shielding line 2302 in the direction perpendicular to the liquid crystal display panel, which is not limited herein.

According to the liquid crystal display panel and the display device provided by an embodiment of the present disclosure, since at least one of the first polarizer and the second polarizer has a light scattering structure, the polarized light of the corresponding colors transmitted by the sub-pixel units with different colors in the liquid crystal display structure can be uniformly diffused by the light scattering structure. That is to say, the light scattering structure plays a role of uniformly mixing the polarized light with different colors to a certain extent. Therefore, the rainbow pattern phenomenon is effectively improved or even eliminated, and the display quality is improved.

Obviously, those skilled in the art can make various modifications and variations to the present disclosure without departing from the spirit and scope of the present disclosure. In this way, if these modifications and variations of the present disclosure fall within the scope of the claims of the present disclosure and their equivalent art, the present disclosure also intends to include these modifications and variations.

What is claimed is:

1. A liquid crystal display panel, comprising:
   a liquid crystal display structure;
   a liquid crystal light control structure arranged in an overlapping manner with the liquid crystal display structure;
   a first polarizer located on one side of the liquid crystal display structure facing away from the liquid crystal light control structure, and
   a second polarizer located on one side of the liquid crystal light control structure facing away from the liquid crystal display structure,
      wherein at least one of the first polarizer and the second polarizer has a light scattering structure.

2. The liquid crystal display panel of claim 1, further comprising:
   a third polarizer located between the liquid crystal display structure and the liquid crystal light control structure, wherein at least one of the first polarizer, the second polarizer and the third polarizer has the light scattering structure.

3. The liquid crystal display panel of claim 1, wherein a film layer in a polarizer having the light scattering structure is doped with transparent particles to constitute the light scattering structure;
   wherein a diameter of a transparent particle is in a nanometer scale; and
   wherein a material of the transparent particles is acrylic or silica.

4. The liquid crystal display panel of claim 3, wherein the polarizer having the light scattering structure comprises:
   a pressure-sensitive adhesive layer,
   a first optical film layer,
   a first adhesive layer,
   a polyvinyl alcohol film layer,
   a second adhesive layer, and
   a second optical film layer,
      wherein the pressure-sensitive adhesive layer, the first optical film layer, the first adhesive layer, the polyvinyl alcohol film layer, the second adhesive layer, and the second optical film layer are successively arranged in an overlapping manner; and
      wherein the pressure-sensitive adhesive layer is disposed between the first optical film layer and the liquid crystal display structure, or the pressure-sensitive adhesive layer is disposed between the first optical film layer and the liquid crystal light control structure, and
      wherein, at least one film layer of the pressure-sensitive adhesive layer, the first optical film layer, the first adhesive layer, the polyvinyl alcohol film layer, the second adhesive layer, and the second optical film layer is doped with the transparent particles, to constitute the light scattering structure.

5. The liquid crystal display panel of claim 4, wherein the pressure-sensitive adhesive layer of the first polarizer is doped with the transparent particles to constitute the light scattering structure.

6. The liquid crystal display panel of claim 4, wherein
   a material of at least one of the first optical film layer and the second optical film layer is triacetyl cellulose; or
   a material of at least one of the first optical film layer and the second optical film layer is polyethylene terephthalate; or
   a material of at least one of the first optical film layer and the second optical film layer is acrylic acid; or
   a material of at least one of the first optical film layer and the second optical film layer is cycloolefin polymer; and wherein
   a material of the first optical film of the first polarizer, a material of the first optical film and the second optical film of the second polarizer, and a material of the first optical film of the third polarizer are triacetyl cellulose;
   a material of the second optical film of the first polarizer is polyethylene terephthalate, acrylic acid or cycloolefin polymer, and
   a material of the second optical film of the third polarizer is polyethylene terephthalate, acrylic acid or cycloolefin polymer.

7. The liquid crystal display panel of claim 4, wherein the pressure-sensitive adhesive layer is doped with transparent particles to constitute the light scattering structure, and the polarizer having the light scattering structure further comprises:
   a fourth adhesive layer disposed on one side of the pressure-sensitive adhesive layer facing away from the first optical film layer, and
   a third optical film layer disposed between the fourth adhesive layer and the pressure-sensitive adhesive layer.

8. The liquid crystal display panel of claim 1, wherein the polarizer having the light scattering structure comprises:
   a pressure-sensitive adhesive layer,
   a first optical film layer, a first adhesive layer,
a polyvinyl alcohol film layer,
a second adhesive layer, and
a second optical film layer,
  wherein the pressure-sensitive adhesive layer, the first optical film layer, the first adhesive layer, the polyvinyl alcohol film layer, the second adhesive layer, and the second optical film layer are successively arranged in an overlapping manner;
  wherein the pressure-sensitive adhesive layer is disposed between the first optical film layer and the liquid crystal display structure, or the pressure-sensitive adhesive layer is disposed between the first optical film layer and the liquid crystal light control structure, and
  wherein the light scattering structure is located on one side of the second optical film layer facing away from the second adhesive layer, and/or
  the light scattering structure is located between the pressure-sensitive adhesive layer and the liquid crystal display structure, and/or
  the light scattering structure is located between at least one pair of two adjacent film layers among the pressure-sensitive adhesive layer, the first optical film layer, the first adhesive layer, the polyvinyl alcohol film layer, the second adhesive layer and the second optical film layer.

9. The liquid crystal display panel of claim 8, wherein the light scattering structure comprises:
an adhesive, and
transparent particles dispersed in the adhesive;
  wherein a diameter of a transparent particle is in a nanometer scale;
  wherein a material of the transparent particles is acrylic or silica.

10. The liquid crystal display panel of claim 9, wherein
the light scattering structure is located on one side of the second optical film layer facing away from the second adhesive layer; and
the polarizer having the light scattering structure further comprises: a transparent protective film disposed on one side of the light scattering structure facing away from the second optical film layer.

11. The liquid crystal display panel of claim 8, wherein the light scattering structure is a film layer constituted by transparent particles;
  wherein a diameter of a transparent particle is in a nanometer scale;
  wherein a material of the transparent particles is acrylic or silica.

12. The liquid crystal display panel of claim 11, wherein
one side of the light scattering structure is in contact with the first adhesive layer or the second adhesive layer; and
the polarizer having the light scattering structure further comprises: a third adhesive layer in contact with the other side of the one of the light scattering structure.

13. The liquid crystal display panel of claim 1, wherein a thickness of the light scattering structure is at least in a nanometer scale.

14. The liquid crystal display panel of claim 1, wherein a haze value of the polarizer having the light scattering structure ranges from 5% to 100%.

15. The liquid crystal display panel of claim 14, wherein the haze value of the polarizer having the light scattering structure ranges from 40% to 80%.

16. The liquid crystal display panel of claim 1,
wherein the liquid crystal light control structure comprises:
  a plurality of signal lines extending in a first direction and a second direction crossing each other, wherein the plurality of signal lines are fold lines;
wherein the liquid crystal display structure comprises:
  a plurality of gate lines extending along the first direction, and
  a plurality of first light-shielding lines,
    wherein the plurality of gate lines overlap with the plurality of first light-shielding lines in a direction perpendicular to the liquid crystal display panel; and
wherein the liquid crystal light control structure comprises:
  a plurality of second light-shielding lines,
    wherein the plurality of signal lines extending along the first direction overlap with the plurality of second light-shielding lines in the direction perpendicular to the liquid crystal display panel; and
    a ratio of a width of the first light-shielding line to a width of the second light-shielding line ranges from 2.5 to 4.

17. The liquid crystal display panel of claim 16, wherein
the width of the first light-shielding line ranges from 100 μm to 120 μm, and
the width of the second light-shielding line ranges from 30 μm to 40 μm.

18. The liquid crystal display panel of claim 16, wherein
the liquid crystal light control structure further comprises:
  a plurality of light control units defined by the plurality of signal lines;
the liquid crystal display structure comprises a plurality of grid lines extending along the first direction and the second direction crossing each other, and a plurality of sub-pixel units defined by the plurality of grid lines, wherein
  N sub-pixel units arranged continuously along the first direction of the plurality of sub-pixel units constitute a pixel unit, wherein N is a positive integer; and
  wherein a plurality of the pixel units and the plurality of light control units are respectively arranged in an array; and
    along the first direction, a maximum length of one of the plurality of light control units is m times a length of one of the plurality of pixel units;
    along the second direction, a width of one of the plurality of the light control units is n times a width of one of the plurality of pixel units; m and n are both positive integers.

19. A display device, comprising the liquid crystal display panel of claim 1 and a backlight.

20. A liquid crystal display panel, comprising:
a liquid crystal display structure;
a liquid crystal light control structure arranged in an overlapping manner with the liquid crystal display structure;
a first polarizer located on one side of the liquid crystal display structure facing away from the liquid crystal light control structure; and
a second polarizer located on one side of the liquid crystal light control structure facing away from the liquid crystal display structure;
wherein at least one of the first polarizer and the second polarizer has a first light scattering structure;

the liquid crystal display structure comprises: a plurality of first gate lines extending along a first direction, and a plurality of first light-shielding lines, wherein the plurality of first gate lines overlap with the plurality of first light-shielding lines in a direction perpendicular to the liquid crystal display panel;

the liquid crystal light control structure comprises: a plurality of second gate lines extending along the first direction, a plurality of second light-shielding lines, wherein the plurality of second gate lines overlap with the plurality of second light-shielding lines in the direction perpendicular to the liquid crystal display panel, and the plurality of second gate lines are fold lines;

a first orthographic projection of the first light-shielding line in the direction perpendicular to the liquid crystal display panel at least partially overlaps with a second orthographic projection of the second light-shielding line in the direction perpendicular to the liquid crystal display panel; and the liquid crystal display panel further comprises:

a second light scattering structure located in an area enclosed by the first orthographic projection and the second orthographic projection, wherein a shape of the area enclosed by the first orthographic projection and the second orthographic projection is a triangle or a semicircle.

\* \* \* \* \*